US012354531B2

(12) United States Patent
Kim et al.

(10) Patent No.: US 12,354,531 B2
(45) Date of Patent: Jul. 8, 2025

(54) EMISSION DRIVER AND DISPLAY APPARATUS INCLUDING THE SAME

(71) Applicants: Samsung Display Co., LTD., Yongin-si (KR); Research & Business Foundation SUNGKYUNKWAN UNIVERSITY, Suwon-si (KR)

(72) Inventors: Haemin Kim, Yongin-si (KR); Yong-Sang Kim, Yongin-si (KR); Kyunghoon Chung, Yongin-si (KR); Eun Kyo Jung, Gunpo-si (KR); Hwarim Im, Seoul (KR)

(73) Assignees: SAMSUNG DISPLAY CO., LTD., Yongin-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 69 days.

(21) Appl. No.: 18/492,823

(22) Filed: Oct. 24, 2023

(65) Prior Publication Data

US 2024/0355270 A1 Oct. 24, 2024

(30) Foreign Application Priority Data

Apr. 21, 2023 (KR) ........................ 10-2023-0052356

(51) Int. Cl.
*G09G 3/32* (2016.01)

(52) U.S. Cl.
CPC ....... *G09G 3/32* (2013.01); *G09G 2300/0426* (2013.01); *G09G 2300/0852* (2013.01); *G09G 2300/0861* (2013.01); *G09G 2310/0286* (2013.01); *G09G 2310/08* (2013.01); *G09G 2320/0214* (2013.01)

(58) Field of Classification Search
CPC .......... G09G 3/20; G09G 3/32; G09G 3/3266; G09G 2300/0861
USPC .......................................................... 345/204
See application file for complete search history.

(56) References Cited

U.S. PATENT DOCUMENTS

2020/0266809 A1* 8/2020 Shi ....................... G09G 3/3225
2022/0319222 A1* 10/2022 Liu ....................... H10K 59/131
2023/0010792 A1* 1/2023 Heo ....................... G11C 19/28

FOREIGN PATENT DOCUMENTS

KR 10-2019-0063624 6/2019
KR 10-2021-0086516 7/2021
KR 10-2022-0065166 5/2022
KR 10-2022-0137200 10/2022

* cited by examiner

*Primary Examiner* — Calvin C Ma
(74) *Attorney, Agent, or Firm* — KILE PARK REED & HOUTTEMAN PLLC

(57) ABSTRACT

An emission driving circuit comprises a pull-up circuit configured to output a first power voltage as an emission signal in response to a voltage of a pull-up control node, a first pull-down control circuit configured to control a voltage of a pull-down control node in response to the voltage of the pull-up control node, and a pull-down circuit configured to output a second power voltage as the emission signal in response to the voltage of the pull-down control node, wherein the first pull-down control circuit comprises a first transistor and a second transistor which are electrically connected in series.

20 Claims, 24 Drawing Sheets

TP1

TP2

TP3

TP4

TP5

TP6

EMISSION DRIVER AND DISPLAY APPARATUS INCLUDING THE SAME

CROSS-REFERENCE TO RELATED APPLICATION

This application claims priority to and benefits of Korean Patent Application No. 10-2023-0052356 under 35 U.S.C. § 119, filed on Apr. 21, 2023 in the Korean Intellectual Property Office (KIPO), the contents of which are incorporated herein by reference in their entireties.

BACKGROUND

1. Technical Field

Embodiments of the disclosure relate to an emission driving circuit and a display apparatus including the same. More particularly, embodiments of the disclosure relate to an emission driving circuit and a display apparatus including the same, in which damage caused by deterioration of transistors is prevented, and a leakage current is reduced, so that a reliability is enhanced.

2. Description of the Related Art

In general, a display apparatus may include a display panel and a display panel driver. The display panel may include gate lines, data lines, emission lines, and pixels. The display panel driver may include a gate driver configured to provide gate signals to the gate lines, a data driver configured to provide data voltages to the data lines, an emission driver configured to provide emission signals to the emission lines, and a driving controller configured to control the gate driver, the data driver, and the emission driver.

Deterioration may occur in some of transistors of the emission driver depending on waveforms of signals applied to the transistors and levels of voltages applied to the transistors. The transistor may be damaged in case that a degree of the deterioration is severe, and the reliability of the emission driver may be reduced in case that the transistor is damaged.

In addition, a leakage current may flow in some of the transistors, which may cause reduction of the reliability of the emission driver.

In general, a low current is used in low-grayscale regions, so that a luminance uniformity may be reduced and a motion blur may occur.

SUMMARY

Embodiments of the disclosure provide an emission driving circuit for improving a reliability.

Embodiments of the disclosure also provide a display apparatus including the emission driving circuit.

In an embodiment of an emission driving circuit according to the disclosure, an emission driving circuit comprises a pull-up circuit configured to output a first power voltage as an emission signal in response to a voltage of a pull-up control node, a first pull-down control circuit configured to control a voltage of a pull-down control node in response to the voltage of the pull-up control node and a pull-down circuit configured to output a second power voltage as the emission signal in response to the voltage of the pull-down control node, wherein the first pull-down control circuit comprises a first transistor and a second transistor which are electrically connected in series.

In an embodiment, the first transistor may include a control electrode electrically connected to the pull-up control node, a first electrode electrically connected to the pull-down control node, and a second electrode electrically connected to a first electrode of the second transistor.

In an embodiment, the second transistor may include a control electrode electrically connected to the pull-up control node, the first electrode electrically connected to the second electrode of the first transistor, and a second electrode that receives which a third power voltage.

In an embodiment, the first pull-down control circuit may further comprise a third transistor including a first electrode electrically connected to a node between the first transistor and the second transistor.

In an embodiment, the third transistor may further include a control electrode electrically connected to the pull-down control node, and a second electrode that receives the first power voltage.

In an embodiment, the first pull-down control circuit may further comprise a third capacitor. The third capacitor may include a first electrode electrically connected to the pull-down control node, and a second electrode that receives the second power voltage.

In an embodiment, the emission driving circuit may further include a first pull-up control circuit configured to control the voltage of the pull-up control node in response to a previous carry signal which is one of carry signals of previous stages. The first pull-up control circuit may comprise a fourth transistor and a fifth transistor which are electrically connected in series. The first pull-up control circuit may further comprise a sixth transistor including a first electrode electrically connected to a node between the fourth transistor and the fifth transistor.

In an embodiment, the fourth transistor may include a control electrode that receives a second clock signal, a first electrode that receives the previous carry signal, and a second electrode electrically connected to a first electrode of the fifth transistor. The fifth transistor may include a control electrode that receives the second clock signal, the first electrode electrically connected to the second electrode of the fourth transistor, and a second electrode electrically connected to the pull-up control node. The sixth transistor may further include a control electrode electrically connected to the pull-up control node, and a second electrode that receives the first power voltage.

In an embodiment, the emission driving circuit may further include a first capacitor including a first electrode that receives a first clock signal, and a second electrode electrically connected to the pull-up control node.

In an embodiment, the emission driving circuit may further include a carry output circuit configured to output a carry signal in response to the voltages of the pull-up control node and the voltage of the pull-down control node.

In an embodiment, the carry output circuit may comprise a seventh transistor. A second electrode of the second transistor may be electrically connected to a second electrode of the seventh transistor. A third power voltage may be applied to the second electrode of the second transistor and the second electrode of the seventh transistor.

In an embodiment, the emission driving circuit may further comprise a second pull-down control circuit configured to control the voltage of the pull-down control node. The second pull-down control circuit may comprise an eighth transistor and a ninth transistor which are electrically connected in series. The second pull-down control circuit may further comprise a second capacitor including a first electrode electrically connected to a node between the eighth transistor and the ninth transistor.

In an embodiment, the eighth transistor may include a control electrode that receives a first clock signal, a first electrode electrically connected to the pull-down control node, and a second electrode electrically connected to a first electrode of the ninth transistor. The ninth transistor may include a control electrode electrically connected to an M node, the first electrode electrically connected to the second electrode of the eighth transistor, and a second electrode that receives the first clock signal. The second capacitor may further include a second electrode electrically connected to the M node.

In an embodiment, the emission driving circuit may further comprise a second pull-up control circuit configured to control the voltage of the pull-up control node. The second pull-up control circuit may comprise a tenth transistor and an eleventh transistor which are electrically connected in series.

In an embodiment, the tenth transistor may include a control electrode that receives a first clock signal, a first electrode electrically connected to the pull-up control node, and a second electrode electrically connected to a first electrode of the eleventh transistor. The eleventh transistor may include a control electrode electrically connected to an M node, the first electrode electrically connected to the second electrode of the tenth transistor, and a second electrode electrically connected to an X node.

In an embodiment, the emission driving circuit may further comprise a first clock signal output terminal that outputs a first clock signal, a second clock signal output terminal that outputs a second clock signal, a third clock signal output terminal that outputs a third clock signal, and a fourth clock signal output terminal that outputs a fourth clock signal. A low-level voltage of each of the third clock signal and the fourth clock signal may be lower than a low-level voltage of each of the first clock signal and the second clock signal.

In an embodiment, the emission driving circuit may further comprise a first pull-up control circuit configured to control the voltage of the pull-up control node in response to a previous carry signal which is one of carry signals of previous stages, a second pull-down control circuit configured to control the voltage of the pull-down control node, a second pull-up control circuit configured to control the voltage of the pull-up control node and a first capacitor electrically connected to the pull-up control node. The first pull-up control circuit may comprise a fourth transistor and a fifth transistor which are electrically connected in series. The second pull-down control circuit may comprise an eighth transistor and a ninth transistor which are electrically connected in series, and a twelfth transistor. The second pull-up control circuit may comprise a tenth transistor and an eleventh transistor which are electrically connected in series. The third clock signal may be applied to a control electrode of the eighth transistor, a control electrode of the tenth transistor, and a first electrode of the first capacitor. The fourth clock signal may be applied to a control electrode of the fourth transistor, a control electrode of the fifth transistor, and a control electrode of the twelfth transistor.

In an embodiment of a gate driving circuit according to the disclosure, an emission driving circuit includes stages. At least one of the stages comprises a first transistor including a control electrode that receives a fourth clock signal, a first electrode that receives a previous carry signal which is one of carry signals of previous stages, and a second electrode electrically connected to a first electrode of a second transistor, the second transistor including a control electrode that receives the fourth clock signal, the first electrode electrically connected to the second electrode of the first transistor, and a second electrode electrically connected to a pull-up control node, a third transistor including a control electrode electrically connected to the pull-up control node, a first electrode electrically connected to the second electrode of the first transistor, and a second electrode that receives a first power voltage, a fourth transistor including a control electrode that receives a third clock signal, a first electrode electrically connected to a pull-down control node, and a second electrode electrically connected to a first electrode of a fifth transistor, the fifth transistor including a control electrode electrically connected to an M node, the first electrode electrically connected to the second electrode of the fourth transistor, and a second electrode that receives a first clock signal, a sixth transistor including a control electrode that receives the third clock signal, a first electrode electrically connected to the pull-up control node, and a second electrode electrically connected to a first electrode of the seventh transistor, the seventh transistor including a control electrode electrically connected to the M node, the first electrode electrically connected to the second electrode of the sixth transistor, and a second electrode electrically connected to an H node, an eighth transistor including a control electrode electrically connected to the pull-up control node, a first electrode that receives a second clock signal, and a second electrode electrically connected to the M node, a ninth transistor including a control electrode that receives the fourth clock signal, a first electrode electrically connected to the M node, and a second electrode that receives the first power voltage, a tenth transistor including a control electrode electrically connected to the pull-down control node, a first electrode that receives the first power voltage and a second electrode electrically connected to a first electrode of a twelfth transistor, an eleventh transistor including a control electrode electrically connected to the pull-up control node, a first electrode electrically connected to the pull-down control node, and a second electrode electrically connected to the first electrode of the twelfth transistor, the twelfth transistor including a control electrode electrically connected to the pull-up control node, the first electrode electrically connected to the second electrode of the eleventh transistor, and a second electrode that receives a third power voltage, a thirteenth transistor including a control electrode electrically connected to the pull-up control node, a first electrode that receives the first power voltage, and a second electrode electrically connected to the H node, a fourteenth transistor including a control electrode electrically connected to the pull-down control node, a first electrode electrically connected to the H node, and a second electrode that receives the third power voltage, a fifteenth transistor including a control electrode electrically connected to the pull-up control node, a first electrode that receives the first power voltage, and a second electrode electrically connected to an X node, a sixteenth transistor including a control electrode electrically connected to the pull-down control node, a first electrode electrically connected to the X node, and a second electrode that receives a second power voltage, a first capacitor including a first electrode that receives the third clock signal, and a second electrode electrically connected to the pull-up control node, and a second capacitor including a first electrode electrically connected to the M node, and a second electrode electrically connected to the first electrode of the fifth transistor.

In an embodiment of a display apparatus according to the disclosure, a display apparatus includes a display panel and an emission driver. The emission driver is configured to output an emission signal to the display panel. The emission driver comprises a pull-up circuit configured to output a first power voltage as the emission signal in response to a voltage of a pull-up control node, a first pull-down control circuit configured to control a voltage of a pull-down control node in response to the voltage of the pull-up control node, and a pull-down circuit configured to output a second power voltage as the emission signal in response to the voltage of the pull-down control node. The first pull-down control circuit comprises a first transistor and a second transistor which are electrically connected in series.

In an embodiment, the emission driver may further comprise a third transistor including a first electrode electrically connected to a node between the first transistor and the second transistor.

According to the emission driving circuit and the display apparatus including the emission driving circuit, the eleventh transistor and the twelfth transistor of the pull-down controller may be connected in series to reduce drain-source voltages of the eleventh transistor and the twelfth transistor, so that damage caused by deterioration may be prevented, a leakage current may be reduced, and a depletion scheme operation may also be handled.

A bootstrapping voltage may be applied to the pull-up control node by bootstrapping of the first capacitor, so that the emission signal and the carry signal may be stably output.

The first power voltage may be applied to the pull-up circuit and the carry output circuit, so that an abnormal output phenomenon may be reduced as compared with a conventional case where a clock signal is applied to the carry output circuit.

A voltage that is lower than a low-level voltage of each of the first clock signal and the second clock signal may be applied to a control electrode of a transistor by using the third clock signal and the fourth clock signal, so that a leakage current may be reduced, and a depletion scheme may be handled.

A second low voltage may be applied to the twelfth transistor and the fourteenth transistor, so that a negative threshold voltage margin may be ensured, a depletion scheme operation may be handled, and a leakage current may be reduced.

An emission duty ratio may be adjusted by adjusting the number of outputs of the carry signal to achieve the same luminance effect even without using a high current, so that a luminance uniformity and motion blur in low-grayscale regions may be enhanced. Therefore, a display quality of the display panel may be enhanced.

The technical objectives to be achieved by the disclosure are not limited to those described herein, and other technical objectives that are not mentioned herein would be clearly understood by a person skilled in the art from the description of the disclosure.

BRIEF DESCRIPTION OF THE DRAWINGS

The above and other features and advantages of the disclosure will become more apparent by describing in detailed embodiments thereof with reference to the accompanying drawings, in which.

DETAILED DESCRIPTION OF THE EMBODIMENTS

Figure 1:
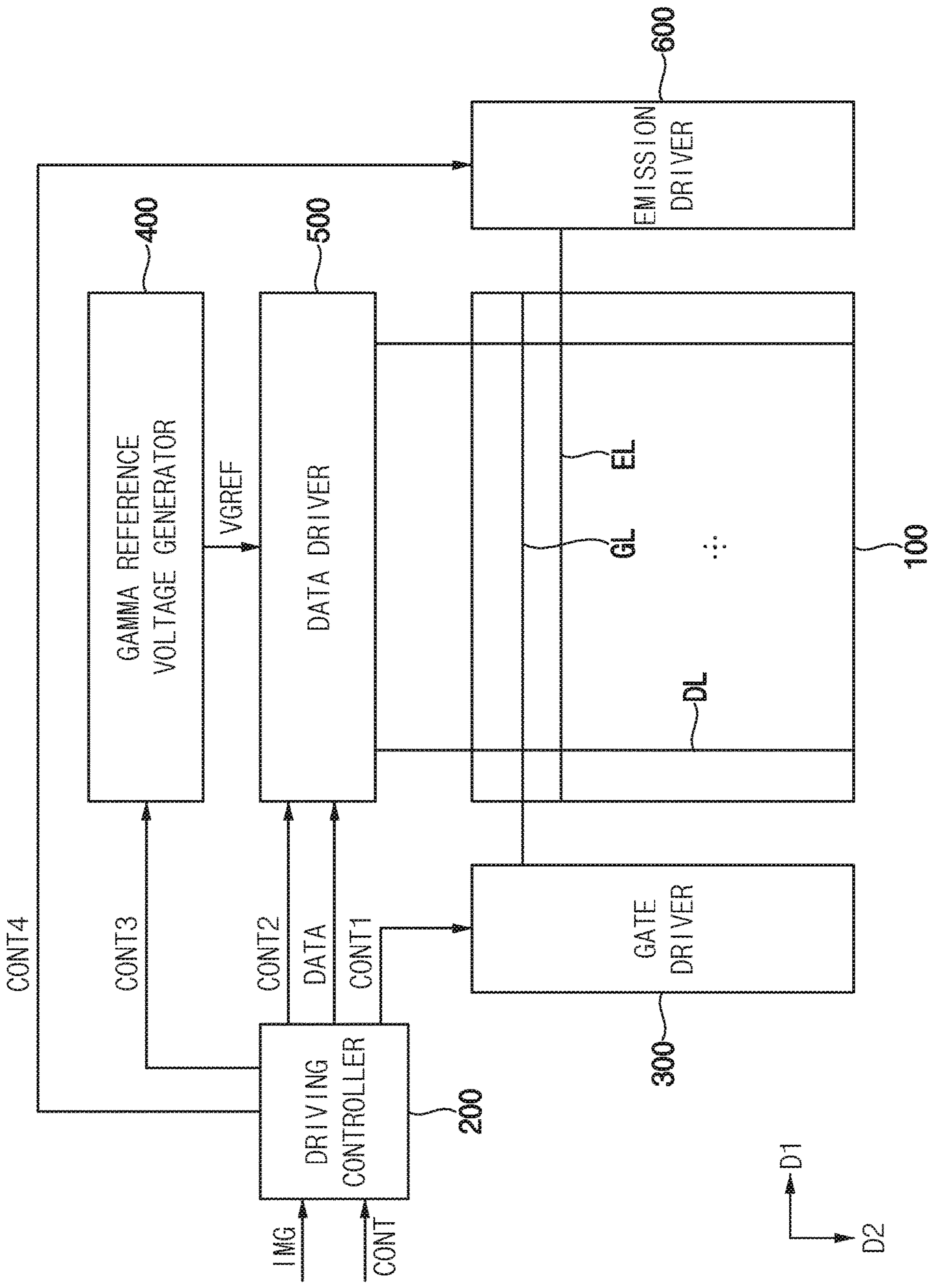
FIG. 1 is a schematic block diagram illustrating a display apparatus according to an embodiment of the disclosure.

Hereinafter, the disclosure will be described in more detail with reference to the accompanying drawings.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

The term "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

The term "and/or" includes all combinations of one or more of which associated configurations may define. For example, "A and/or B" may be understood to mean "A, B, or A and B."

For the purposes of this disclosure, the phrase "at least one of A and B" may be construed as A only, B only, or any combination of A and B. Also, "at least one of X, Y, and Z" and "at least one selected from the group consisting of X. Y, and Z" may be construed as X only, Y only, Z only, or any combination of two or more of X, Y, and Z.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

FIG. 1 is a schematic block diagram illustrating a display apparatus according to an embodiment of the disclosure.

Referring to FIG. 1, the display apparatus may include a display panel 100 and a display panel driver. The display panel driver may include a driving controller 200, a gate driver 300, a gamma reference voltage generator 400, a data driver 500, and/or an emission driver 600.

The display panel 100 may include a display part configured to display an image, and a peripheral part that is adjacent to the display part.

The display panel 100 may include gate lines GL, data lines DL, and pixels electrically connected to the gate lines GL and the data lines DL, respectively. The gate lines GL may extend in a first direction D1, and the data lines DL may extend in a second direction D2 intersecting the first direction D1.

The driving controller 200 may receive input image data IMG and/or an input control signal CONT from a device, e.g., an external device. For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a gate control signal CONT1, a data control signal CONT2, a gamma control signal CONT3, an emission control signal CONT4, and a data signal DATA based on the input image data IMG and the input control signal CONT.

The driving controller 200 may generate the gate control signal CONT1 for controlling an operation of the gate driver 300 based on the input control signal CONT to output the generated gate control signal CONT1 to the gate driver 300. The gate control signal CONT1 may include a vertical start signal and a gate clock signal.

The driving controller 200 may generate the data control signal CONT2 for controlling an operation of the data driver 500 based on the input control signal CONT to output the generated data control signal CONT2 to the data driver 500. The data control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the gamma control signal CONT3 for controlling an operation of the gamma reference voltage generator 400 based on the input control signal CONT to output the generated gamma control signal CONT3 to the gamma reference voltage generator 400.

The driving controller 200 may generate the emission control signal CONT4 for controlling an operation of the emission driver 600 based on the input control signal CONT to output the generated emission control signal CONT4 to the emission driver 600.

The gate driver 300 may generate gate signals for driving the gate lines GL in response to the gate control signal CONT1 transmitted from the driving controller 200. The gate driver 300 may output the gate signals to the gate lines GL. For example, the gate driver 300 may sequentially output the gate signals to the gate lines GL. For example, the gate driver 300 may be mounted on the peripheral region of the display panel. For example, the gate driver 300 may be integrated on (or in) the peripheral region of the display panel.

The gamma reference voltage generator 400 may generate a gamma reference voltage VGREF in response to the gamma control signal CONT3 transmitted from the driving controller 200. The gamma reference voltage generator 400 may provide the gamma reference voltage VGREF to the data driver 500.

In an embodiment, the gamma reference voltage generator 400 may be disposed in the driving controller 200 or in the data driver 500.

The data driver 500 may receive the data control signal CONT2 and the data signal DATA from the driving controller 200, and receive the gamma reference voltage VGREF from the gamma reference voltage generator 400. The data driver 500 may convert the data signal DATA into an analog data voltage by using the gamma reference voltage VGREF. The data driver 500 may output the data voltages to the data lines DL.

The emission driver 600 may generate emission signals for driving the emission lines EL in response to the emission control signal CONT4 transmitted from the driving controller 200. The emission driver 600 may output the emission signals to the emission lines EL. For example, the emission driver 600 may be integrated on (or in) the peripheral region of the display panel 100. For example, the emission driver 600 may be mounted on the peripheral region of the display panel 100.

Although it has been illustrated in FIG. 1 that the gate driver 300 is disposed on a first side of the display panel 100, and the emission driver 600 is disposed on a second side of the display panel 100, which is opposite to the first side, the disclosure is not limited thereto. The gate driver 300 and the emission driver 600 may be disposed on the same side of the display panel 100. For example, the gate driver 300 and the emission driver 600 may be integrated on (or in) the peripheral region of the display panel 100 on the same side of the display region of the display panel 100. For example, the gate driver 300 and the emission driver 600 may be formed integrally with each other.

Figure 2:
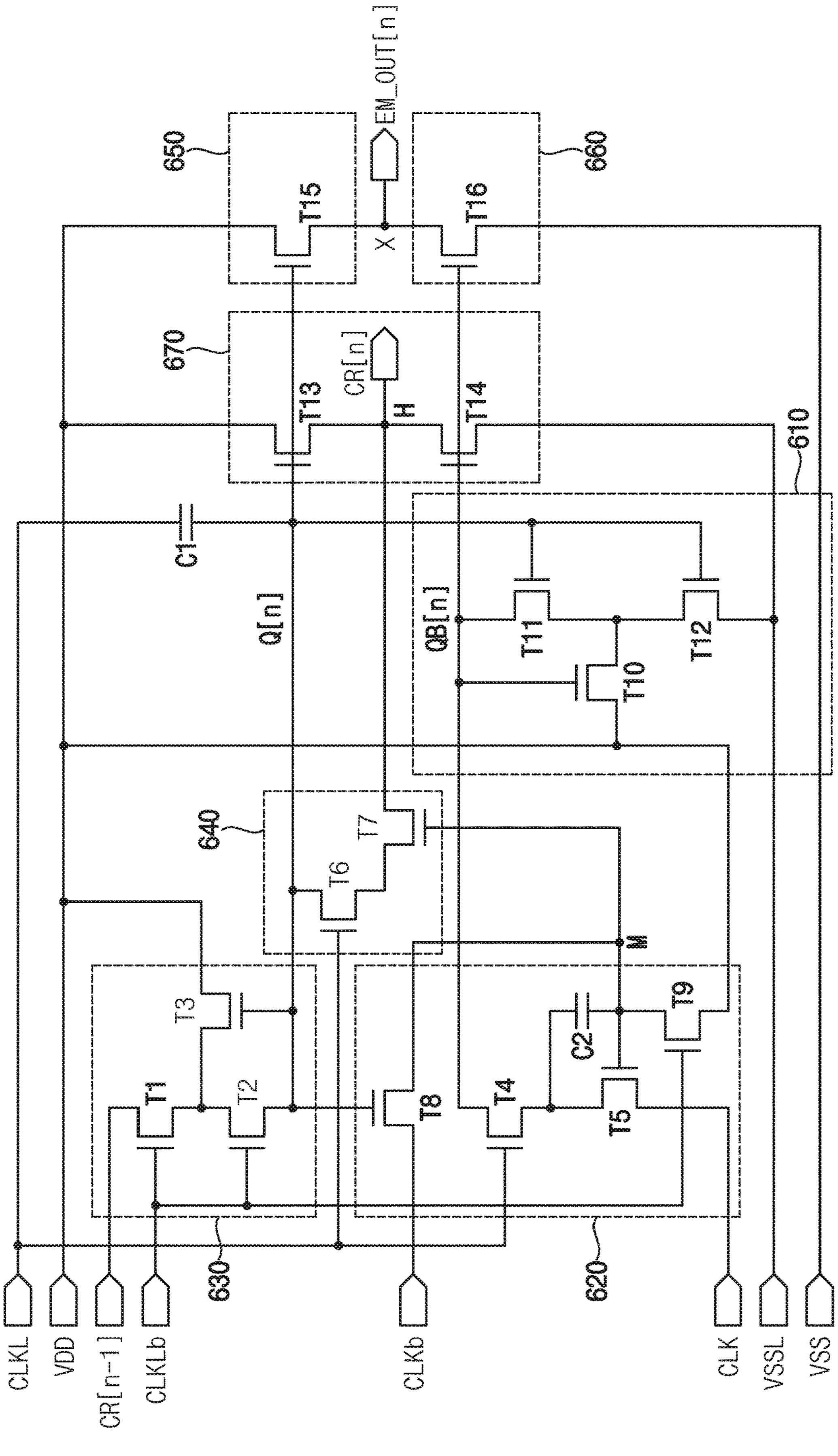
FIG. 2 is a schematic diagram of an equivalent circuit illustrating an emission driving circuit of an emission driver of FIG. 1.
Figure 3:
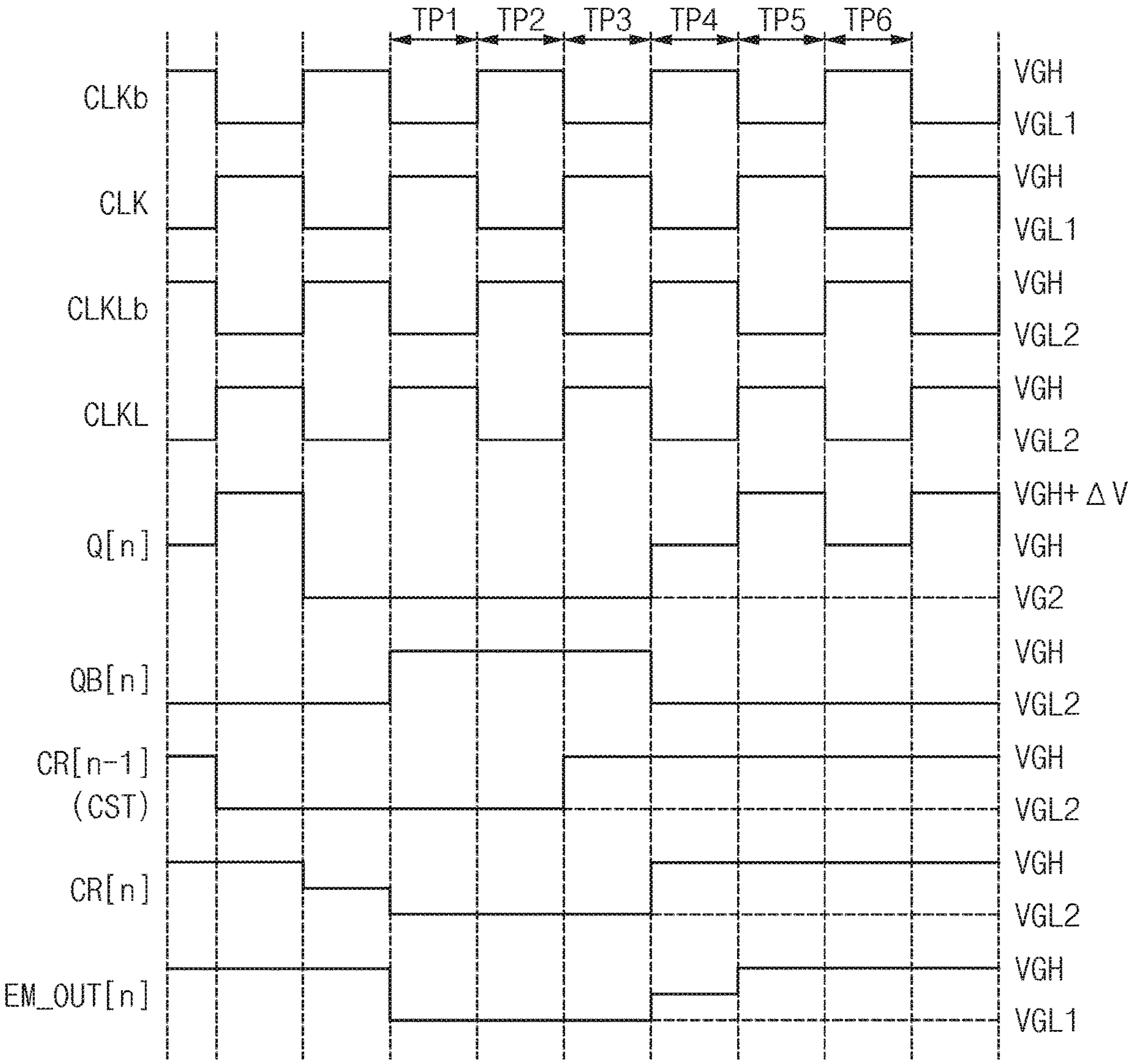
FIG. 3 is a schematic timing diagram illustrating an input signal, a node signal, and an output signal of the emission driving circuit of FIG. 2.

FIG. 2 is a schematic diagram of an equivalent circuit illustrating an emission driving circuit of an emission driver 600 of FIG. 1. FIG. 3 is a schematic timing diagram illustrating an input signal, a node signal, and an output signal of the emission driving circuit of FIG. 2.

Referring to FIGS. 1 to 3, an emission driving circuit may include multiple stages. For example, a first stage of the emission driving circuit may output an emission signal corresponding to a first emission line, and a second stage of the emission driving circuit may output an emission signal corresponding to a second emission line.

The emission driving circuit may include a pull-up circuit 650, a first pull-down control circuit 610, and/or a pull-down circuit 660. The emission driving circuit may further include a second pull-down control circuit 620, a first pull-up control circuit 630, a second pull-up control circuit 640, and/or a carry output circuit 670. The emission driving circuit may further include a first capacitor C1. The emission driving circuit may further include an output terminal of a first clock signal CLK, an output terminal of a second clock signal CLKb, an output terminal of a third clock signal CLKL, and an output terminal of a fourth clock signal CLKLb.

The first pull-down control circuit 610 may control a voltage of a pull-down control node QB in response to a voltage of a pull-up control node Q.

For example, the first pull-down control circuit 610 may include an eleventh transistor T11 and a twelfth transistor T12, which are connected in series.

In case that the voltage of the pull-up control node Q has an active level, the eleventh transistor T11 and the twelfth transistor T12 may be turned on, so that a third power voltage VSSL may be applied to the pull-down control node QB. The third power voltage VSSL may be a second low voltage VGL2.

In case that the voltage of the pull-down control node QB has an active level, high drain-source voltage stress may be applied to a transistor connected between the pull-down control node QB and a terminal of the third power voltage VSSL. However, the first pull-down control circuit 610 of the emission driving circuit according to embodiments of the disclosure may be configured such that two transistors connected in series, for example, the eleventh and twelfth transistors T11 and T12, are disposed between the pull-down control node QB and the terminal of the third power voltage VSSL. Therefore, even in case that the voltage of the pull-down control node QB has the active level, the high drain-source voltage stress between the pull-down control node QB and the terminal of the third power voltage VSSL may be distributed to the eleventh transistor T11 and the twelfth transistor T12. Accordingly, the drain-source voltage stress applied to each of the eleventh transistor T11 and the twelfth transistor T12 may be reduced or minimized. The two transistors connected in series may be called to a series-two-transistor (STT) structure.

For example, the eleventh transistor T11 may include a control electrode connected to the pull-up control node Q, a first electrode connected to the pull-down control node QB, and a second electrode connected to a first electrode of the twelfth transistor T12. For example, the twelfth transistor T12 may include a control electrode connected to the pull-up control node Q, the first electrode connected to the second electrode of the eleventh transistor T11, and a second electrode to which the third power voltage VSSL is applied.

For example, the first pull-down control circuit 610 may include a tenth transistor T10 including a control electrode connected to the pull-down control node QB, a first electrode to which a first power voltage VDD is applied, and a second electrode connected to the second electrode of the eleventh transistor T11. The first power voltage VDD may be a high voltage VGH.

In case that the voltage of the pull-down control node QB has the active level, the tenth transistor T10 may apply the first power voltage VDD to a node between the eleventh and twelfth transistors T11 and T12. Accordingly, a gate-source voltage of the eleventh transistor T11 may become lower than a threshold voltage of the eleventh transistor T11. Therefore, the eleventh transistor T11 may be completely turned off, so that a leakage current may be reduced, and a depletion scheme operation may be handled.

The second pull-down control circuit 620 may apply the high voltage VGH to the pull-down control node QB.

For example, the second pull-down control circuit 620 may include a fourth transistor T4 and a fifth transistor T5, which are connected in series. For example, the second pull-down control circuit 620 may further include an eighth transistor T8, a ninth transistor T9, and a second capacitor C2 including a first electrode connected to a node between the fourth transistor T4 and the fifth transistor T5.

A second electrode of the second capacitor C2 may be connected to an M node to control the fifth transistor T5 and a seventh transistor T7 through bootstrapping. In addition, a gate-source voltage of the fourth transistor T4 may become lower than a threshold voltage of the fourth transistor T4 through the bootstrapping of the second capacitor C2, so that the fourth transistor T4 may be completely turned off. Since the fourth transistor T4 is completely turned off, a leakage current may be reduced, and a depletion scheme operation may be handled.

For example, the fourth transistor T4 may include a control electrode to which the third clock signal CLKL is applied, a first electrode connected to the pull-down control node QB, and a second electrode connected to a first electrode of the fifth transistor T5. For example, the fifth transistor T5 may include a control electrode connected to the M node, the first electrode connected to the second electrode of the fourth transistor T4, and a second electrode to which the first clock signal CLK is applied. For example, the eighth transistor T8 may include a control electrode connected to the pull-up control node Q, a first electrode to which the second clock signal CLKb is applied, and a second electrode connected to the M node. For example, the ninth transistor T9 may include a control electrode to which the fourth clock signal CLKLb is applied, a first electrode connected to the M node, and a second electrode to which the first power voltage VDD is applied, and the second capacitor C2 may include the first electrode connected to the first electrode of the fifth transistor T5, and the second electrode connected to the M node.

According to the embodiment, the second clock signal CLKb may periodically transition between the high voltage VGH and a first low voltage VGL1. In addition, according to the embodiment, the fourth clock signal CLKLb may periodically transition between the high voltage VGH and the second low voltage VGL2 with substantially the same phase as the second clock signal CLKb. In addition, according to the embodiment, the second low voltage VGL2 may be lower than the first low voltage VGL1. In other words, the fourth clock signal CLKLb may have substantially the same phase and substantially the same high voltage VGH as the second clock signal CLKb, whereas the fourth clock signal CLKLb may have the second low voltage VGL2 that is lower than the first low voltage VGL1 of the second clock signal CLKb.

According to the embodiment, the first clock signal CLK may periodically transition between the high voltage VGH and the first low voltage VGL1. The first clock signal CLK may have a phase that is opposite to the phase of the second clock signal CLKb. The first clock signal CLK may have a phase that is opposite to the phase of the fourth clock signal CLKLb. In other words, the first clock signal CLK may be an inverted signal of the second clock signal CLKb.

According to the embodiment, the third clock signal CLKL may periodically transition between the high voltage VGH and the second low voltage VGL2. The third clock signal CLKL may have a phase that is opposite to the phase of each of the second clock signal CLKb and the fourth clock signal CLKLb. In other words, the third signal CLKL may be an inverted signal of the fourth clock signal CLKLb.

The first pull-up control circuit 630 may apply a previous carry signal CR[n−1] to the pull-up control node Q in response to the fourth clock signal CLKLb.

According to the embodiment, the previous carry signal CR[n−1] may be a carry signal of a stage n−1 immediately before a current stage n. Although a case where the previous carry signal CR[n−1] is the carry signal of the stage n−1 immediately before the current stage n has been illustrated in the embodiment, the disclosure is not limited thereto. Since a first stage does not have a previous stage, a start signal CST may be applied to the first stage instead of the previous carry signal CR[n−1].

For example, the first pull-up control circuit 630 may include a first transistor T1 and a second transistor T2, which are connected in series. The first pull-up control circuit 630 may further include a third transistor T3 including a first electrode connected to a node between the first transistor T1 and the second transistor T2.

In case that the voltage of the pull-up control node Q has the active level, a high drain-source voltage stress may be applied to a transistor connected between the pull-up control node Q and an input terminal of the previous carry signal CR[n−1]. However, the first pull-up control circuit 630 of the emission driving circuit according to the embodiments of the disclosure may be configured such that two transistors connected in series, for example, the first and second transistors T1 and T2, are disposed between the pull-up control node Q and the input terminal of the previous carry signal CR[n−1]. Therefore, even in case that the voltage of the pull-up control node Q has the active level, the high drain-source voltage stress between the pull-up control node Q and the input terminal of the previous carry signal CR[n−1] may be distributed to the first transistor T1 and the second transistor T2. Accordingly, the drain-source voltage stress applied to each of the first transistor T1 and the second transistor T2 may be reduced or minimized.

In case that the voltage of the pull-up control node Q has the active level, the third transistor T3 may apply the first power voltage VDD to the node between the first and second transistors T1 and T2. Accordingly, a gate-source voltage of the second transistor T2 may become lower than a threshold voltage of the second transistor T2. Since the third transistor T3 applies the first power voltage VDD, the second transistor T2 may be completely turned off, so that a leakage current may be reduced, and a depletion scheme operation may be handled.

The second pull-up control circuit 640 may apply the third power voltage VSSL to the pull-up control node Q in response to the third clock signal CLKL and a voltage of the M node.

For example, the second pull-up control circuit 640 may include a sixth transistor T6 and a seventh transistor T7, which are connected in series.

For example, the sixth transistor T6 may include a control electrode to which the third clock signal CLKL is applied, a first electrode connected to the pull-up control node Q, and a second electrode connected to a first electrode of the seventh transistor T7. The seventh transistor T7 may include a control electrode connected to the M node, the first electrode connected to the second electrode of the sixth transistor T6, and a second electrode connected to an H node.

The first capacitor C1 may bootstrap the voltage of the pull-up control node Q.

For example, the first capacitor C1 may include a first electrode to which the third clock signal CLKL is applied, and a second electrode connected to the pull-up control node Q.

The first capacitor C1 may allow the voltage of the pull-up control node Q to be a voltage that is higher than the high voltage VGH through the bootstrapping.

The first capacitor C1 may apply the third clock signal CLKL to the pull-up control node Q. Accordingly, the pull-up control node Q may periodically transition between the high voltage VGH and the voltage that is higher than the high voltage VGH (hereinafter referred to as a "bootstrapped voltage (VGH+ΔV)") in an active state. Accordingly, gate-source voltages of the eleventh transistor T11 and the twelfth transistor T12 may be reduced as compared with a case where the pull-up control node Q continuously has the bootstrapped voltage (VGH+ΔV), so that damage caused by deterioration of the eleventh transistor T11 and the twelfth transistor T12 may be prevented. Since the damage caused by the deterioration of the eleventh transistor T11 and the twelfth transistor T12 is prevented, reliability of the emission driving circuit and the display apparatus may be enhanced.

The pull-up circuit 650 may output the first power voltage VDD as an emission signal EM_OUT in response to the pull-up control node Q.

For example, the pull-up circuit 650 may include a fifteenth transistor T15.

According to the embodiment, the fifteenth transistor T15 may include a first electrode connected to a terminal of the first power voltage VDD. The fifteenth transistor T15 may be connected to the terminal of the first power voltage VDD to prevent an abnormal output of the emission signal EM_OUT.

The pull-down circuit 660 may output the second power voltage VSS as the emission signal EM_OUT in response to the pull-down control node QB. For example, the second power voltage VSS may be the first low voltage VGL1.

The carry output circuit 670 may output a carry signal CR[n] in response to the pull-up control node Q and the pull-down control node QB.

For example, the carry output circuit 670 may include a thirteenth transistor T13 and a fourteenth transistor T14.

According to the embodiment, the thirteenth transistor T13 may include a first electrode connected to the terminal of the first power voltage VDD. The thirteenth transistor T13 may be connected to the terminal of the first power voltage VDD to prevent an abnormal output of the carry signal CR[n].

According to the embodiment, a second electrode of the fourteenth transistor T14 may be connected to the terminal of the third power voltage VSSL. The second low voltage VGL2 may be output as the carry signal CR[n]. Therefore, a negative threshold voltage margin may be ensured, a depletion scheme operation may be handled, and a leakage current may be reduced.

The output terminal of the first clock signal CLK, the output terminal of the second clock signal CLKb, the output terminal of the third clock signal CLKL, and the output terminal of the fourth clock signal CLKLb may output the first to fourth clock signals CLK, CLKb, CLKL, and CLKLb, respectively.

For example, a low-level voltage of each of the third clock signal CLKL and the fourth clock signal CLKLb may be lower than a low-level voltage of each of the first clock signal CLK and the second clock signal CLKb.

For example, the low-level voltage of each of the first clock signal CLK and the second clock signal CLKb may be the first low voltage VGL1, and the low-level voltage of each of the third clock signal CLKL and the fourth clock signal CLKLb may be the second low voltage VGL2.

For example, the third clock signal CLKL may be applied to the control electrode of the fourth transistor T4, the control electrode of the sixth transistor T6, and the first electrode of the first capacitor C1. For example, the fourth clock signal CLKLb may be applied to the control electrode of the first transistor T1, the control electrode of the second transistor T2, and the control electrode of the ninth transistor T9.

The low-level voltage of each of the third clock signal CLKL and the fourth clock signal CLKLb, which is lower than the low-level voltage of each of the first clock signal CLK and the second clock signal CLKb, may be applied to the control electrodes of the transistors T1, T2, T4, T6, and T9 and the first electrode of the first capacitor C1. Accordingly, a depletion scheme operation may be handled, and a leakage current may be reduced.

According to a conventional emission driving circuit, a transistor configured to output a carry signal having a low voltage may be turned on for most of a time (approximately 99.8% of the time) of a frame period, so that gate-source voltage stress may be continuously applied to the transistor. However, according to the emission driver 600 of the embodiments of the disclosure, the fourteenth transistor T14 configured to output the second low voltage VGL2 as the carry signal CR[n] may be turned on in response to the fourth clock signal CLKLb having a duty ratio of about 50%. In other words, the fourteenth transistor T14 may be repeatedly turned on and off in response to the fourth clock signal CLKLb in each frame period. Therefore, the fourteenth transistor T14 may be turned on for about 50% of a time of the frame period, and a time during which gate-source voltage stress is applied to the fourteenth transistor T14 may be reduced.

The emission driving circuit may operate normally in a normal mode or an enhancement mode, and may also operate normally in a depletion mode in which each of the transistors T1 to T16 of the emission driver 600 has a negative threshold voltage.

According to an embodiment, as shown in FIG. 2, the transistors T1 to T16 of the emission driver 600 may be N-type metal oxide semiconductor (NMOS) transistors or oxide transistors. According to another embodiment, some or all of the transistors T1 to T16 of the emission driver 600 may be P-type metal oxide semiconductor (PMOS) transistors.

Hereinafter, an example of an operation of the emission driver 600 will be described with reference to FIGS. 1 to 9.

Figure 4:
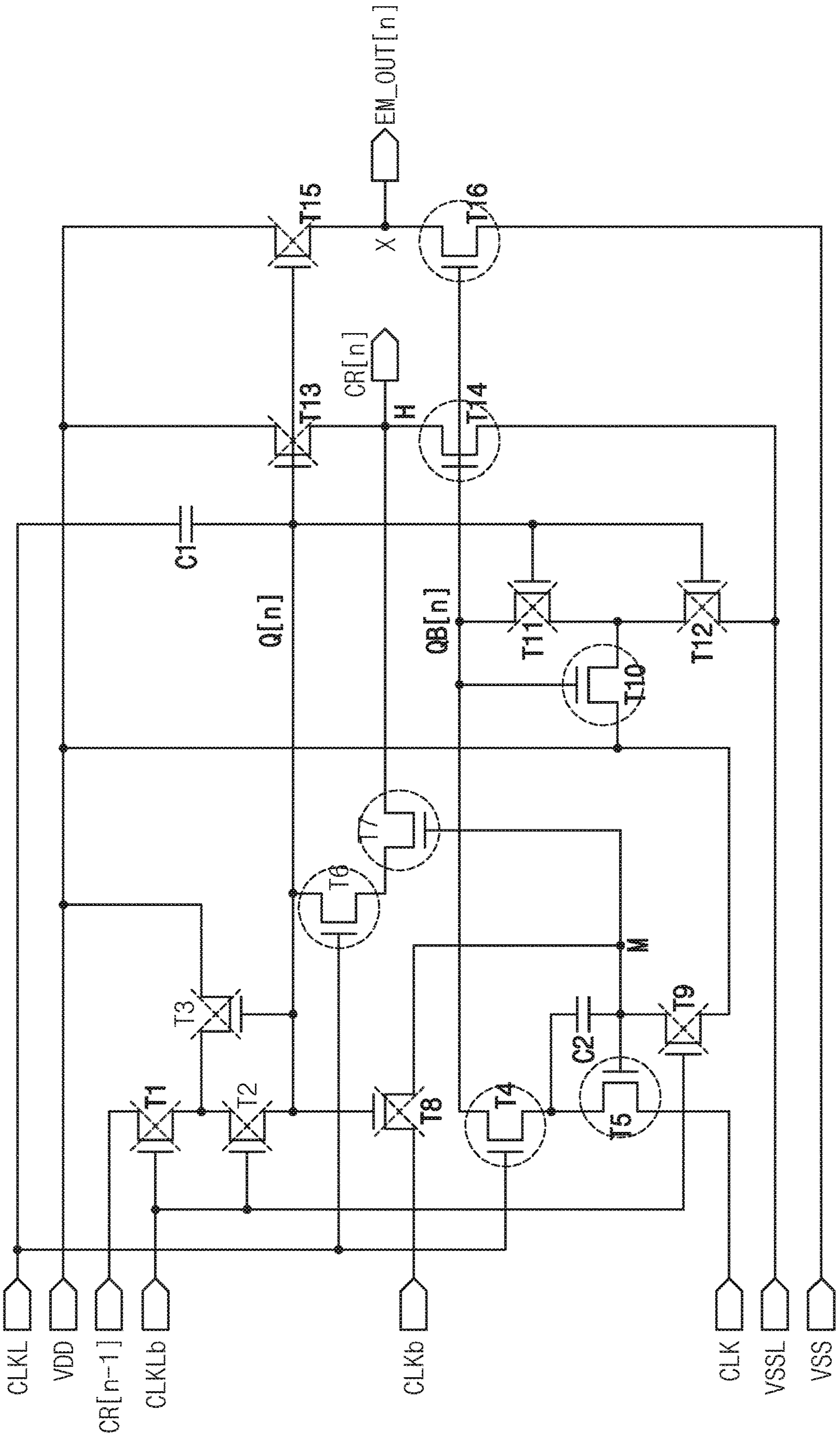
FIG. 4 is a schematic diagram of an equivalent circuit for describing an operation of a stage of FIG. 2 in a first time period of FIG. 3.
Figure 5:
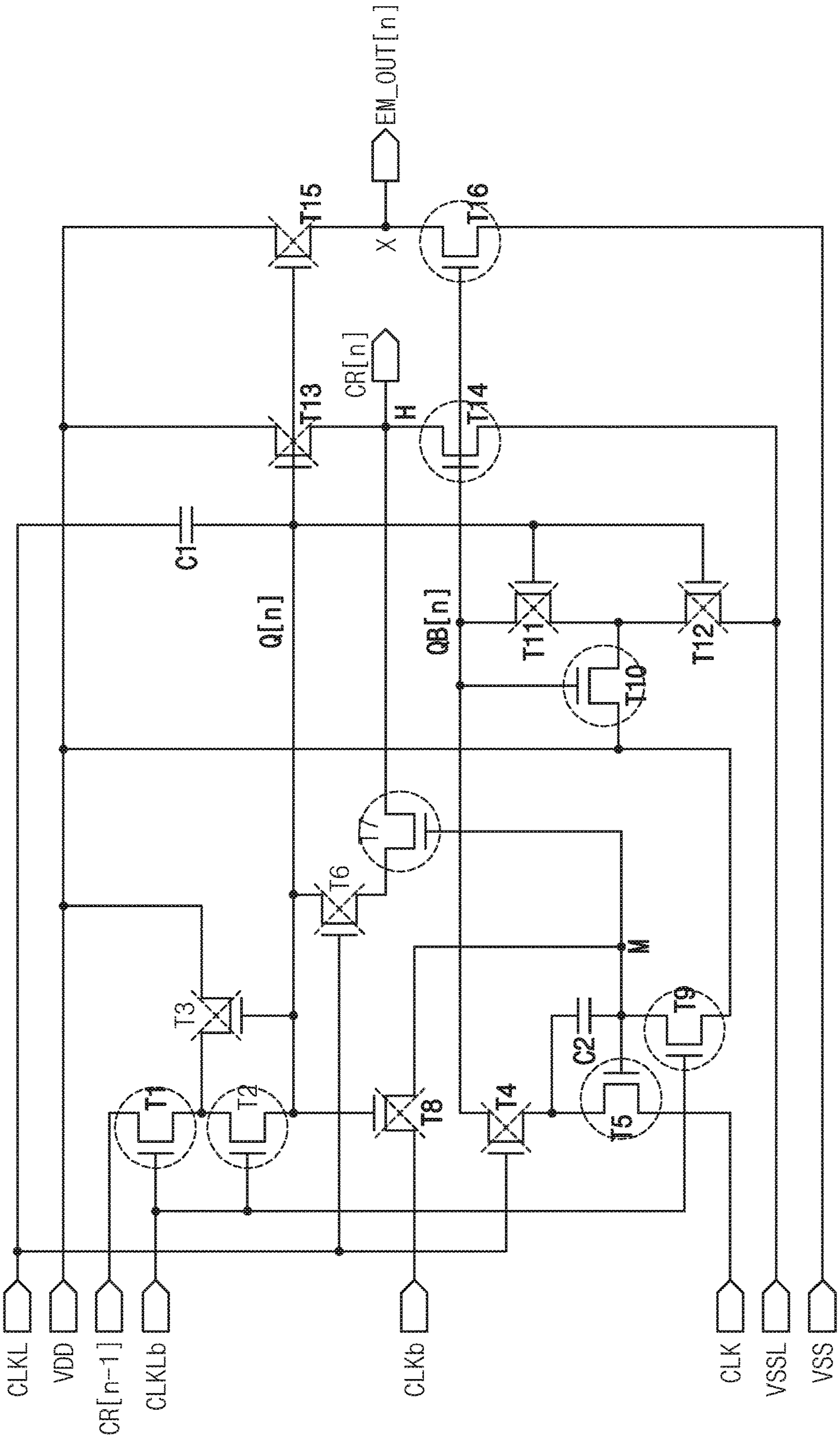
FIG. 5 is a schematic diagram of an equivalent circuit for describing an operation of the stage of FIG. 2 in a second time period of FIG. 3.
Figure 6:
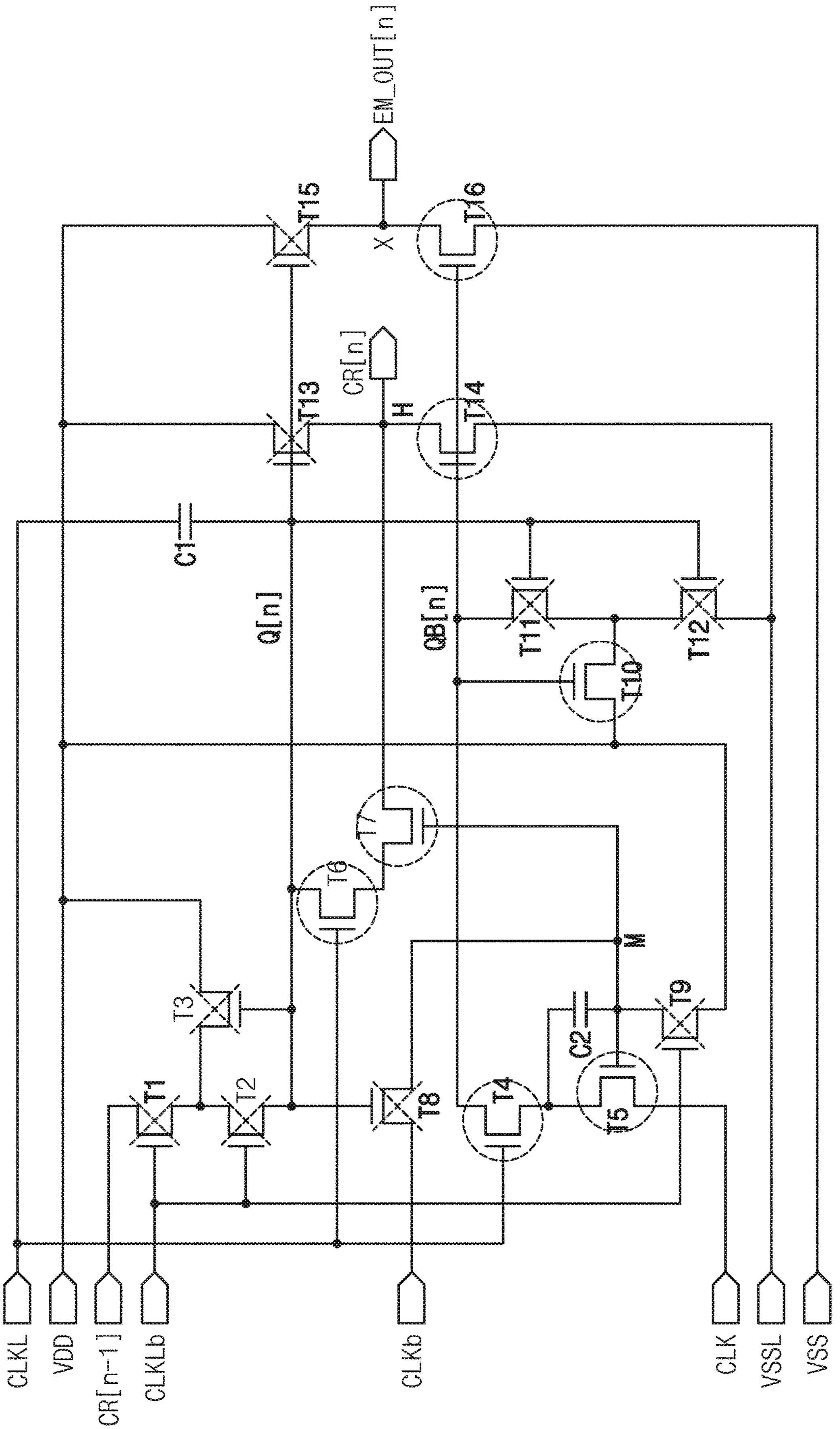
FIG. 6 is a schematic diagram of an equivalent circuit for describing an operation of the stage of FIG. 2 in a third time period of FIG. 3.
Figure 7:
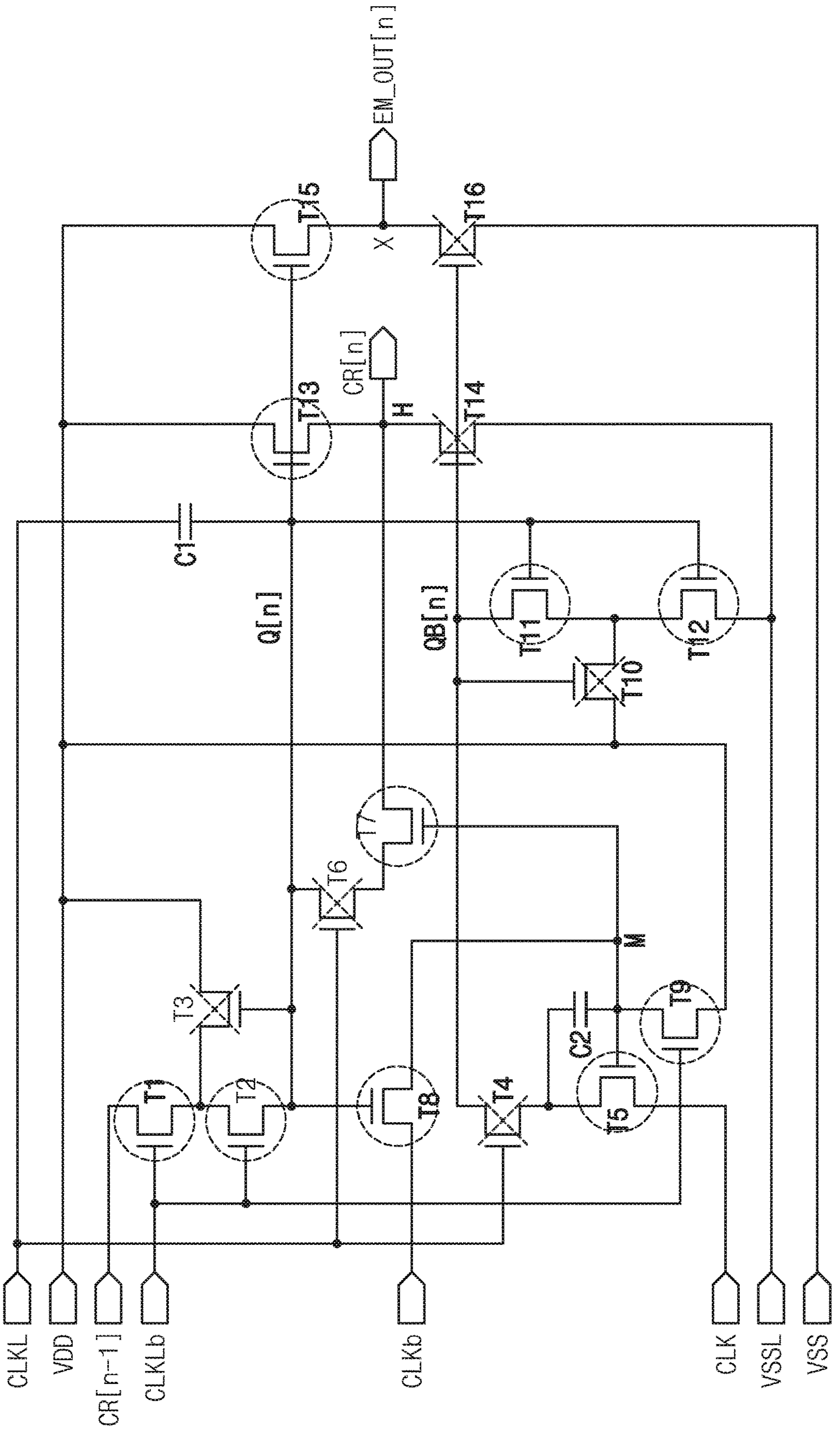
FIG. 7 is a schematic diagram of an equivalent circuit for describing an operation of the stage of FIG. 2 in a fourth time period of FIG. 3.
Figure 8:
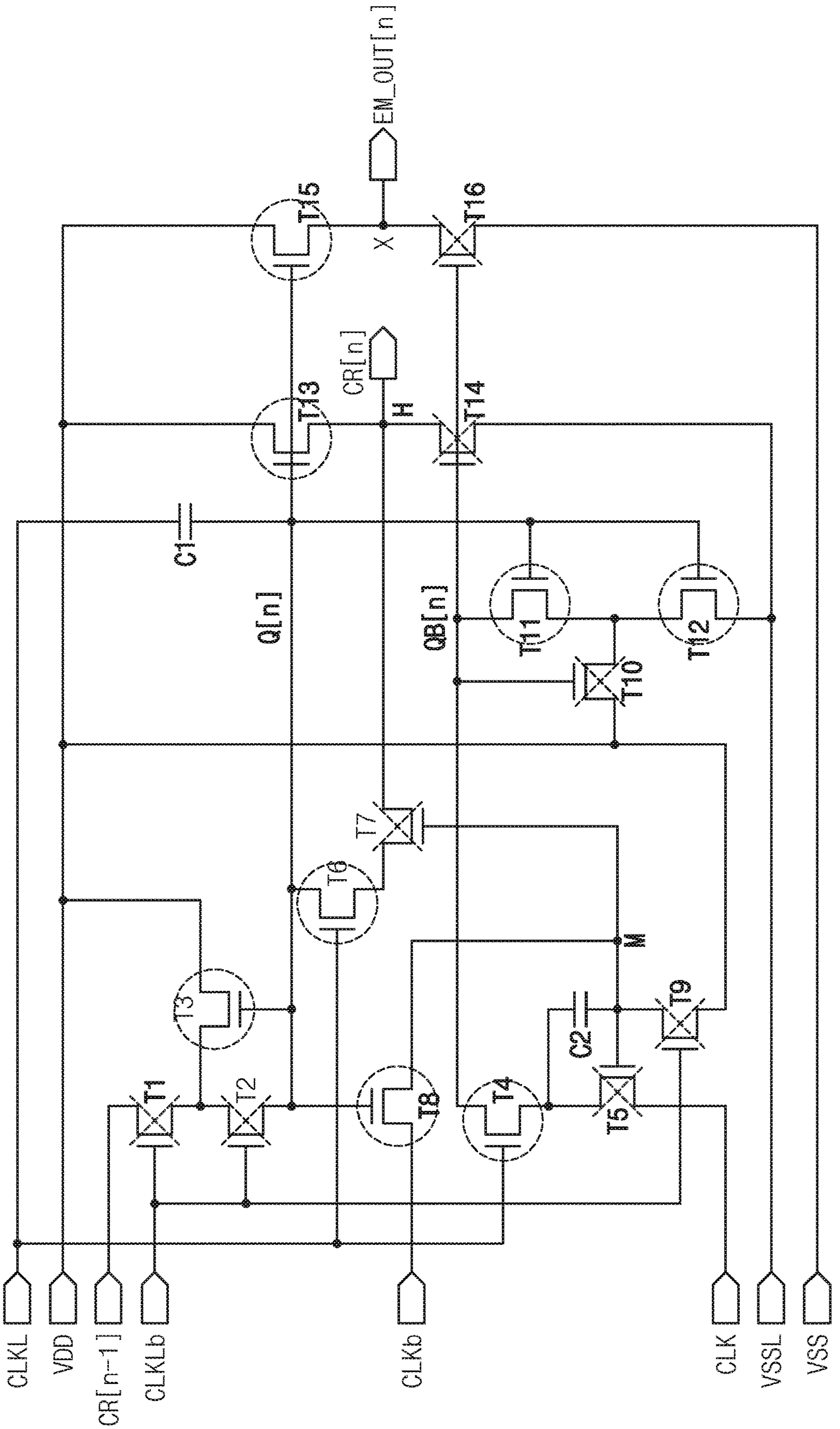
FIG. 8 is a schematic diagram of an equivalent circuit for describing an operation of the stage of FIG. 2 in a fifth time period of FIG. 3.
Figure 9:
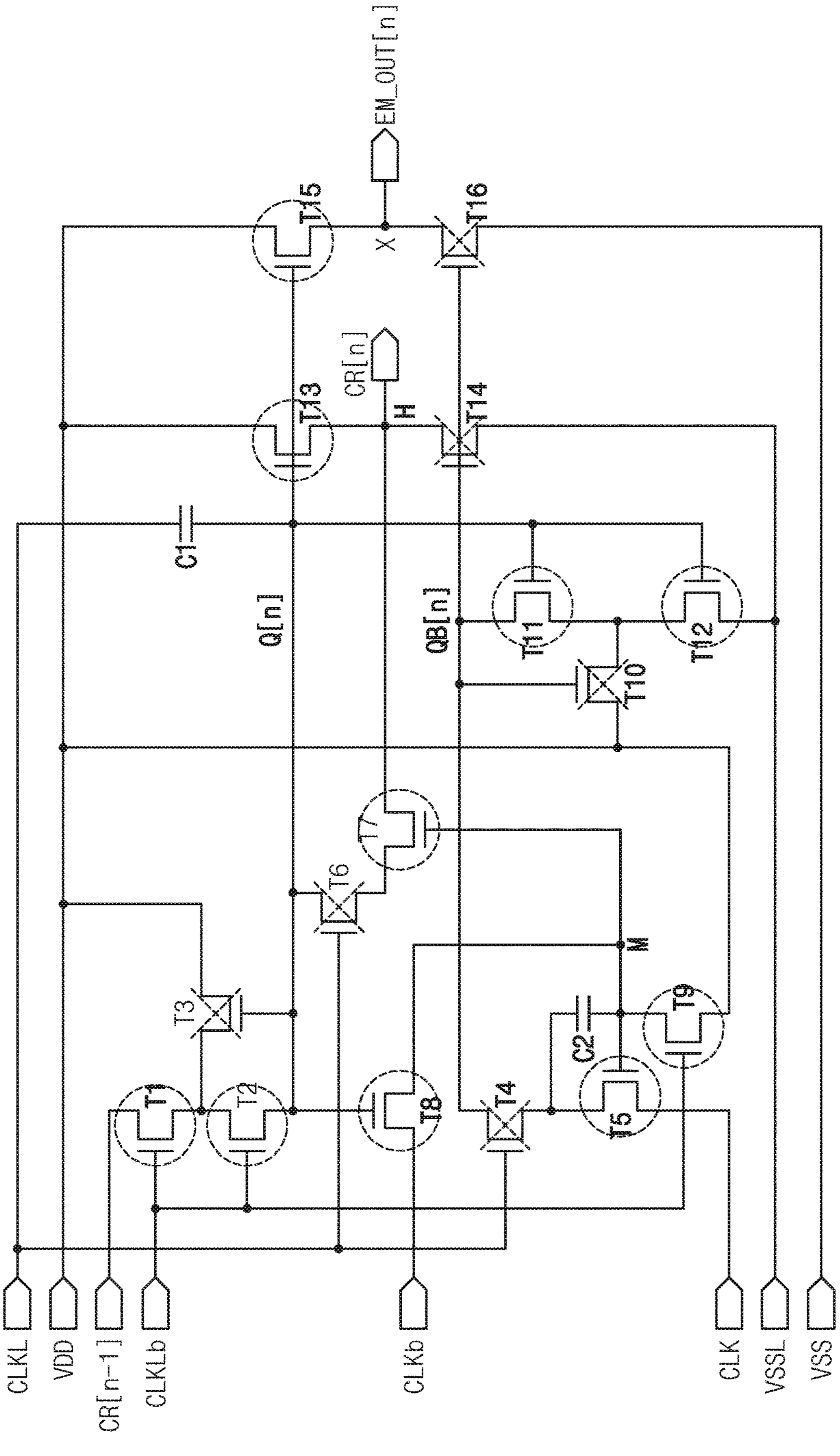
FIG. 9 is a schematic diagram of an equivalent circuit for describing an operation of the stage of FIG. 2 in a sixth time period of FIG. 3.

FIG. 3 is a schematic timing diagram for describing an operation of a stage of FIG. 2, FIG. 4 is a schematic diagram of an equivalent circuit for describing an operation of a stage of FIG. 2 in a first time period TP1, FIG. 5 is a schematic diagram of an equivalent circuit for describing an operation of the stage of FIG. 2 in a second time period TP2, FIG. 6 is a schematic diagram of an equivalent circuit for describing an operation of the stage of FIG. 2 in a third time period TP3, FIG. 7 is a schematic diagram of an equivalent circuit for describing an operation of the stage of FIG. 2 in a fourth time period TP4, FIG. 8 is a schematic diagram of an equivalent circuit for describing an operation of the stage of FIG. 2 in a fifth time period TP5, and FIG. 9 is a schematic diagram of an equivalent circuit for describing an operation of the stage of FIG. 2 in a sixth time period TP6.

Referring to FIGS. 2 and 3, the emission driving circuit may receive the first clock signal CLK, the second clock signal CLKb, the third clock signal CLKL, and the fourth clock signal CLKLb. According to an embodiment, each of the first clock signal CLK, the second clock signal CLKb, the third clock signal CLKL, and the fourth clock signal CLKLb may have a duty ratio of 50%.

The first clock signal CLK and the second clock signal CLKb may periodically transition between the high voltage VGH and the first low voltage VGL1, and may have phases that are opposite to each other. In other words, the second clock signal CLKb may be an inverted signal of the first clock signal CLK.

The third clock signal CLKL and the fourth clock signal CLKLb may periodically transition between the high voltage VGH and the second low voltage VGL2 that is lower than the first low voltage VGL1, and may have phases that are opposite to each other. In other words, the fourth clock signal CLKLb may be an inverted signal of the third clock signal CLKL.

In a first time period TP1, as shown in FIGS. 3 and 4, the fourth transistor T4 may be turned on in response to the third clock signal CLKL, and the fifth transistor T5 may be turned on due to the bootstrapping of the second capacitor C2. The fourth transistor T4 and the fifth transistor T5 may apply the high voltage VGH of the first clock signal CLK to the pull-down control node QB. The pull-down control node QB may have the high voltage VGH, and the fourteenth transistor T14 and the sixteenth transistor T16 may be turned on. Accordingly, the third power voltage VSSL may be output as the carry signal CR[n], and the second power voltage VSS may be output as the emission signal EM_OUT[n]. The sixth transistor T6 may be turned on in response to the third clock signal CLKL, and the seventh transistor T7 may be turned on due to the bootstrapping of the second capacitor C2. The third power voltage VSSL may be applied to the pull-up control node Q through the sixth transistor T6, the seventh transistor T7, and the fourteenth transistor T14. The tenth transistor T10 may be turned on in response to the pull-down control node QB, and the first power voltage VDD may be applied to the node between the eleventh transistor T11 and the twelfth transistor T12. The high voltage VGH of the pull-down control node QB may be maintained through the STT structure of the eleventh transistor T11 and the twelfth transistor T12. Since the first power voltage VDD is applied to the node between the eleventh transistor T11 and the twelfth transistor T12, the gate-source voltage of the eleventh transistor T11 may become lower than the threshold voltage of the eleventh transistor T11. Accordingly, the high voltage VGH of the pull-down control node QB may be maintained.

In a second time period TP2, as shown in FIGS. 3 and 5, the first transistor T1 and the second transistor T2 may be turned on in response to the fourth clock signal CLKLb. Accordingly, the previous carry signal CR[n−1] having the second low voltage VGL2 may be applied to the pull-up control node Q. The voltage of the pull-down control node QB may be maintained at the high voltage VGH. Accordingly, the third power voltage VSSL may be applied to the carry signal CR[n], and the second power voltage VSS may be output as the emission signal EM_OUT[n]. The high voltage VGH of the pull-down control node QB may be maintained through the STT structure of the eleventh transistor T11 and the twelfth transistor T12. Since the first power voltage VDD is applied to the node between the eleventh transistor T11 and the twelfth transistor T12, the gate-source voltage of the eleventh transistor T11 may become lower than the threshold voltage of the eleventh transistor T11. Accordingly, the high voltage VGH of the pull-down control node QB may be maintained. Due to the bootstrapping of the second capacitor C2, the gate-source voltage of the fourth transistor T4 may become lower than the threshold voltage of the fourth transistor T4. Accordingly, the high voltage VGH of the pull-down control node QB may be maintained.

In a third time period TP3, as shown in FIGS. 3 and 6, the fourth transistor T4 may be turned on in response to the third clock signal CLKL, and the fifth transistor T5 may be turned on due to the bootstrapping of the second capacitor C2. The fourth transistor T4 and the fifth transistor T5 may apply the high voltage VGH of the first clock signal CLK to the pull-down control node QB. The pull-down control node QB may have the high voltage VGH, and the fourteenth transistor T14 and the sixteenth transistor T16 may be turned on. Accordingly, the third power voltage VSSL may be applied to the carry output circuit 670, and the emission signal EM_OUT[n] may have the second power voltage VSS. The sixth transistor T6 may be turned on in response to the third clock signal CLKL, and the seventh transistor T7 may be turned on due to the bootstrapping of the second capacitor C2. The third power voltage VSSL may be applied to the pull-up control node Q through the sixth transistor T6, the seventh transistor T7, and the fourteenth transistor T14. The tenth transistor T10 may be turned on in response to the pull-down control node QB. The tenth transistor T10 may apply the first power voltage VDD to the node between the eleventh transistor T11 and the twelfth transistor T12. The high voltage VGH of the pull-down control node QB may be maintained through the STT structure of the eleventh transistor T11 and the twelfth transistor T12. Since the first power voltage VDD may be applied to the node between the eleventh transistor T11 and the twelfth transistor T12, the gate-source voltage of the eleventh transistor T11 may become lower than the threshold voltage of the eleventh transistor T11. Therefore, the high voltage VGH of the pull-down control node QB may be maintained.

In a fourth time period TP4, as shown in FIGS. 3 and 7, the first transistor T1 and the second transistor T2 may be turned on in response to the fourth clock signal CLKLb. Accordingly, the previous carry signal CR[n−1] having the high voltage VGH may be applied to the pull-up control node Q. The thirteenth transistor T13 and the fifteenth transistor T15 may be turned on in response to the pull-up control node Q. The eleventh transistor T11 and the twelfth transistor T12 may be turned on in response to the pull-up control node Q. Accordingly, the third power voltage VSSL may be applied to the pull-down control node QB. The fourteenth transistor T14 and the sixteenth transistor T16 may be turned off in response to the pull-down control node QB.

In a fifth time period TP5, as shown in FIGS. 3 and 8, the first transistor T1 and the second transistor T2 may be turned off in response to the fourth clock signal CLKLb. The pull-up control node Q may be in a floating state, and the pull-up control node Q may have the bootstrapped voltage (VGH+ΔV) due to the bootstrapping of the first capacitor C1. The third transistor T3 may be turned on in response to the pull-up control node Q, and the first power voltage VDD may be applied to the node between the first transistor T1 and the second transistor T2. The high voltage VGH of the pull-up control node Q may be maintained through the STT structure of the first transistor T1 and the second transistor T2. Since the first power voltage VDD is applied to the node between the first transistor T1 and the second transistor T2, the gate-source voltage of the second transistor T2 may become lower than the threshold voltage of the second transistor T2. Accordingly, the high voltage VGH of the pull-up control node Q may be maintained. The eleventh transistor T11 and the twelfth transistor T12 may be turned on in response to the pull-up control node Q. Accordingly, the third power voltage VSSL may be applied to the pull-down control node QB.

In a sixth time period TP6, as shown in FIGS. 3 and 9, the first transistor T1 and the second transistor T2 may be turned on in response to the fourth clock signal CLKLb. Accordingly, the previous carry signal CR[n−1] having the high voltage VGH may be applied to the pull-up control node Q. The thirteenth transistor T13 and the fifteenth transistor T15 may be turned on in response to the pull-up control node Q. The eleventh transistor T11 and the twelfth transistor T12 may be turned on in response to the pull-up control node Q. Accordingly, the third power voltage VSSL may be applied to the pull-down control node QB. The fifth and sixth time periods TP5 and TP6 in which the high voltage VGH is output as the emission signal EM_OUT[n] may correspond to an emission period of the frame period. As shown in FIG. 3, the same waveform as in the fifth and sixth time periods TP5 and TP6 may be repeated during a time except for the first to fourth time periods TP1 to TP4.

Figure 10:
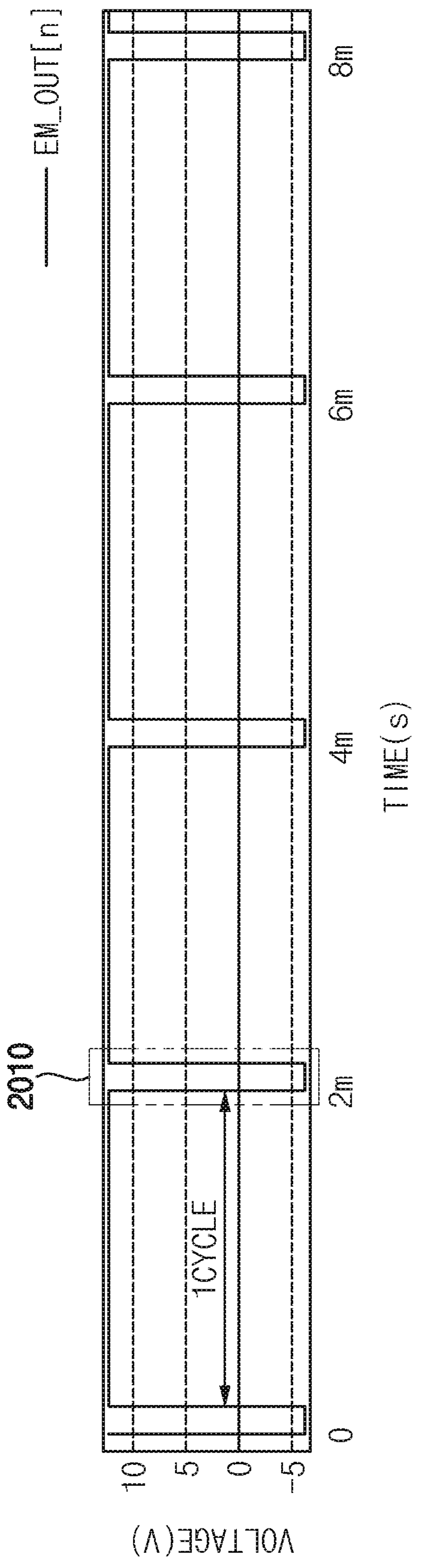
FIG. 10 is a schematic graph illustrating a voltage of an emission signal in case that a high emission duty ratio is output during an operation of the emission driving circuit of FIG. 2.
Figure 11:
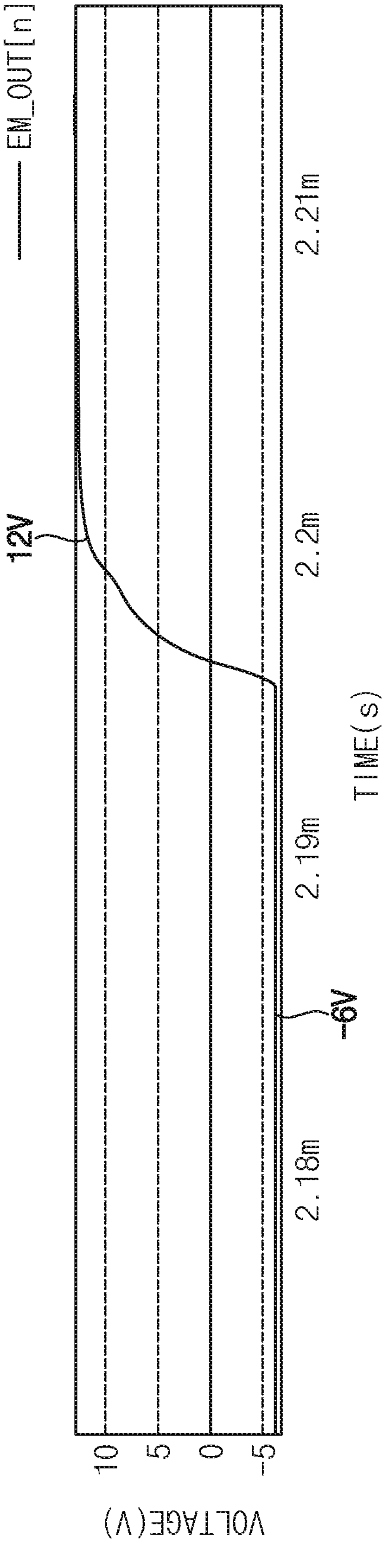
FIG. 11 is a schematic enlarged graph illustrating a portion 2010 of FIG. 10.

FIGS. 10 and 11 are schematic graphs illustrating a voltage of an emission signal in case that a high emission duty ratio is output during an operation of the emission driving circuit of FIG. 2.

For example, it may be found that an off-on voltage of the high voltage VGH is normally output at the first low voltage VGL1 for an emission duty ratio of about 90%. For example, according to the graphs, the first low voltage VGL1 may be approximately −6 V, and the high voltage VGH may be approximately 12 V.

Figure 12:
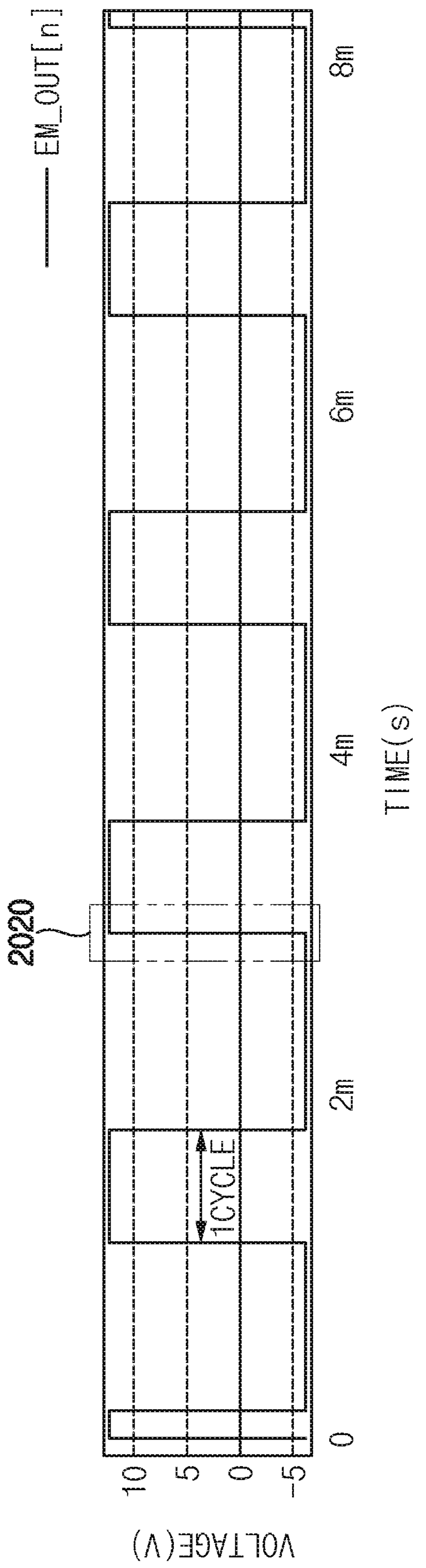
FIG. 12 is a schematic graph illustrating a voltage of an emission signal in case that a low emission duty ratio is output during an operation of the emission driving circuit of FIG. 2.
Figure 13:
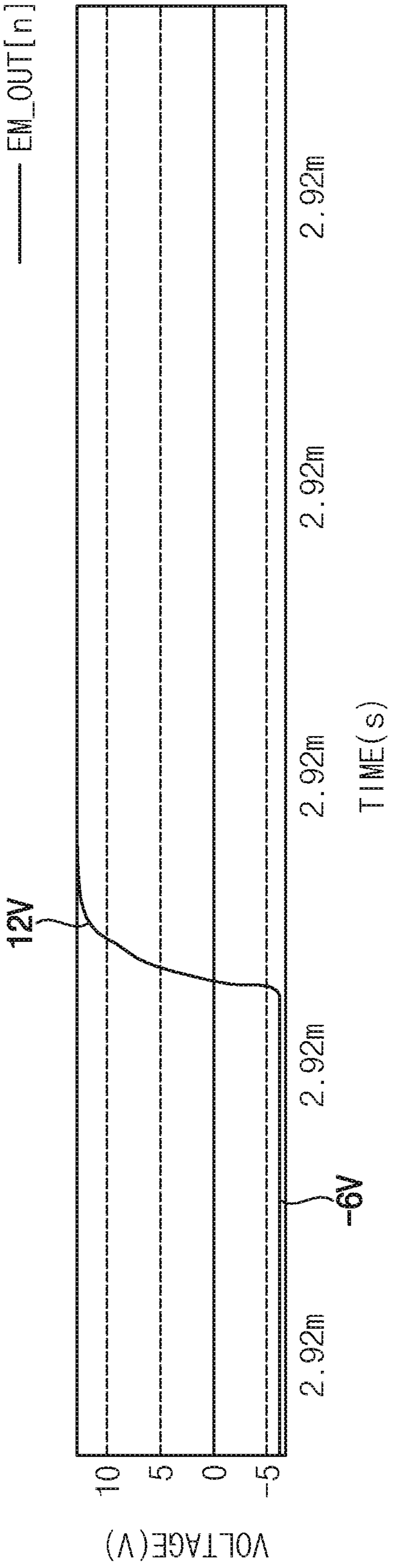
FIG. 13 is a schematic enlarged graph illustrating a portion 2020 of FIG. 12.

FIGS. 12 and 13 are schematic graphs illustrating a voltage of an emission signal in case that a low emission duty ratio is output during an operation of the emission driving circuit of FIG. 2.

For example, it may be found that the off-on voltage of the high voltage VGH is normally output at the first low voltage VGL1 for an emission duty ratio of about 30%. For example, according to the graphs, the first low voltage VGL1 may be approximately −6 V, and the high voltage VGH may be approximately 12 V.

Figure 14:
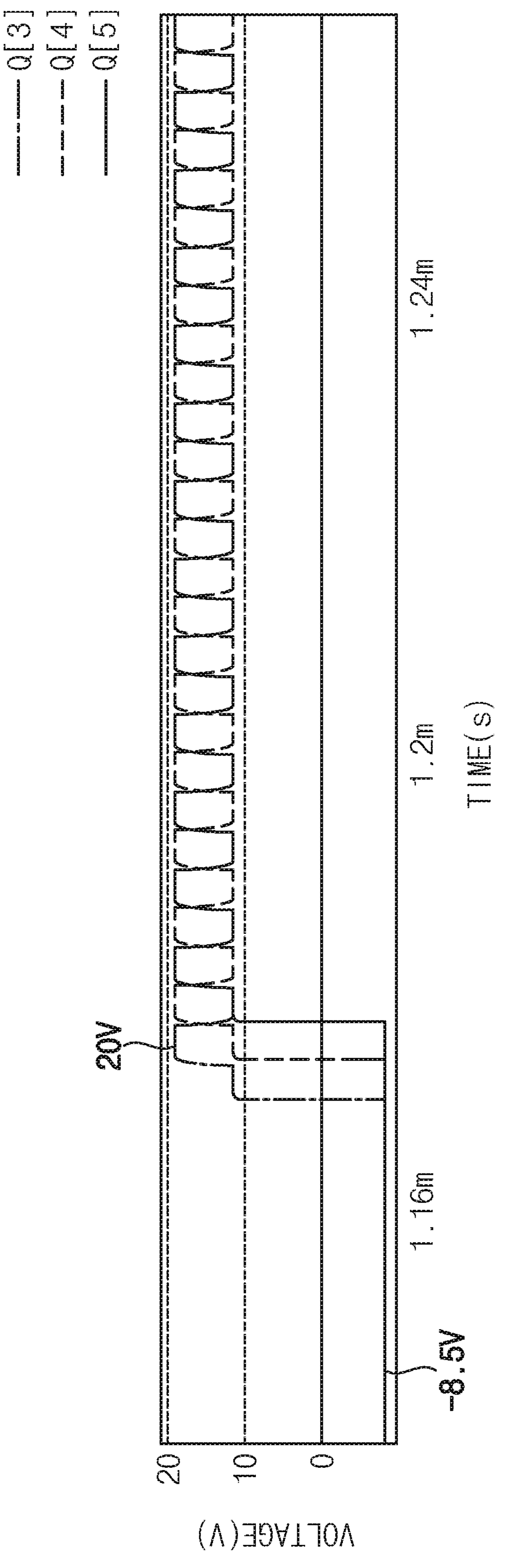
FIG. 14 is a schematic graph illustrating an example of a Q[n] node voltage in case that the emission driving circuit of FIG. 2 includes transistors driven in a depletion mode.

FIG. 14 is a schematic graph illustrating an example of a Q[n] node voltage in case that the emission driving circuit of FIG. 2 includes transistors driven in a depletion mode.

A threshold voltage of each of transistors driven in the depletion mode may be, for example, approximately −2 V.

FIG. 14 shows an example of a third pull-up control node voltage Q[3], a fourth pull-up control node voltage Q[4], and a fifth pull-up control node voltage Q[5] of the emission driving circuit. It may be found in the pull-up control node Q that approximately 20 V is normally exhibited as an example of the bootstrapped voltage (VGH+ΔV), and approximately −8.5 V is normally output as an example of the second low voltage VGL2.

Figure 15:
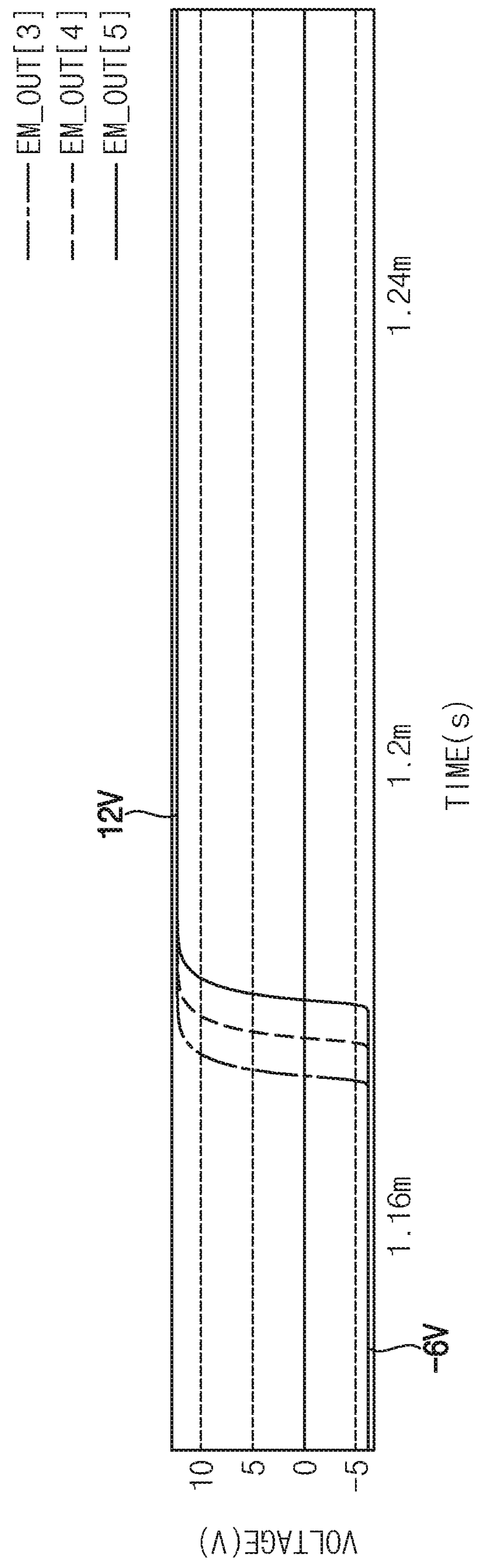
FIG. 15 is a schematic graph illustrating an example of an emission signal in case that the emission driving circuit of FIG. 2 includes the transistors driven in the depletion mode.

FIG. 15 is a schematic graph illustrating an example of an emission signal in case that the emission driving circuit of FIG. 2 includes the transistors driven in the depletion mode.

It may be found that a third emission signal EM_OUT[3], a fourth emission signal EM_OUT[4], and a fifth emission signal EM_OUT[5] of the emission driving circuit are normally output as the off-on voltage of the high voltage VGH at the first low voltage VGL1. For example, according to the graph, the first low voltage VGL1 may be approximately −6 V, and the high voltage VGH may be approximately 12 V.

Figure 16:
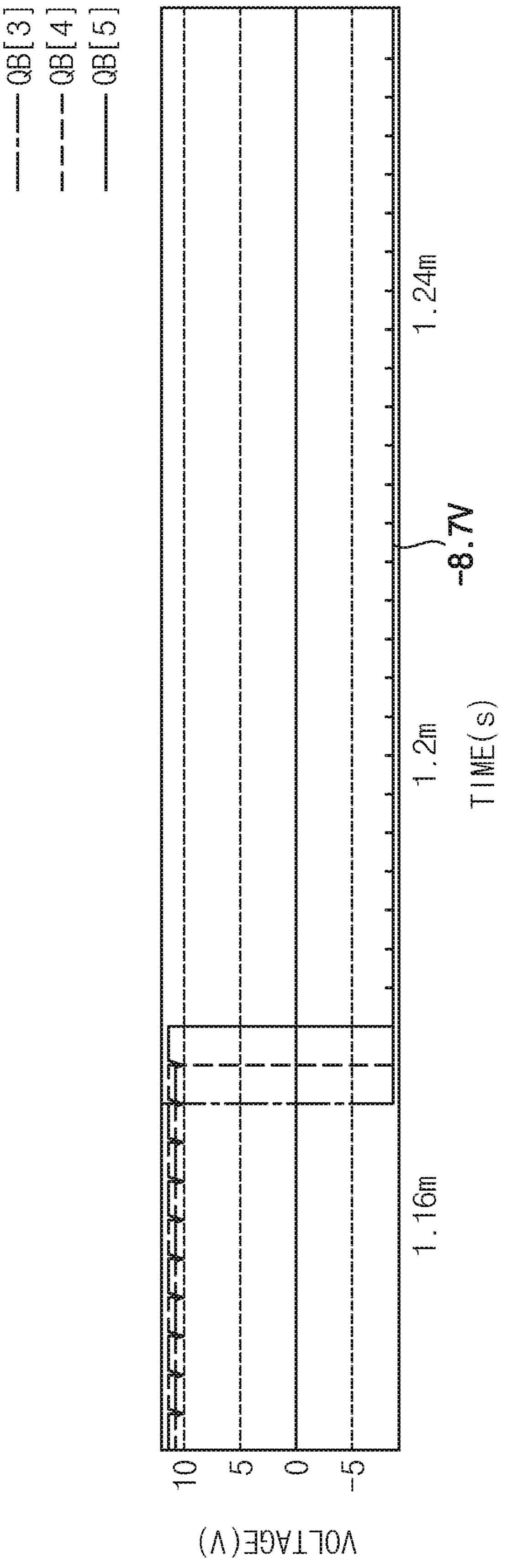
FIG. 16 is a schematic graph illustrating an example of a QB[n] node voltage in case that the emission driving circuit of FIG. 2 includes the transistors driven in the depletion mode.

FIG. 16 is a schematic graph illustrating an example of a QB[n] node voltage in case that the emission driving circuit of FIG. 2 includes the transistors driven in the depletion mode.

One example of a third pull-down control node voltage QB[3], a fourth pull-down control node voltage QB[4], and a fifth pull-down control node voltage QB[5] of the emission driving circuit is shown. It may be found in the pull-down control node QB that approximately −8.7 V is normally output as an example of the second low voltage VGL2.

Referring to FIGS. 14 to 16, the emission driving circuit may handle a depletion operation scheme.

Figure 17:
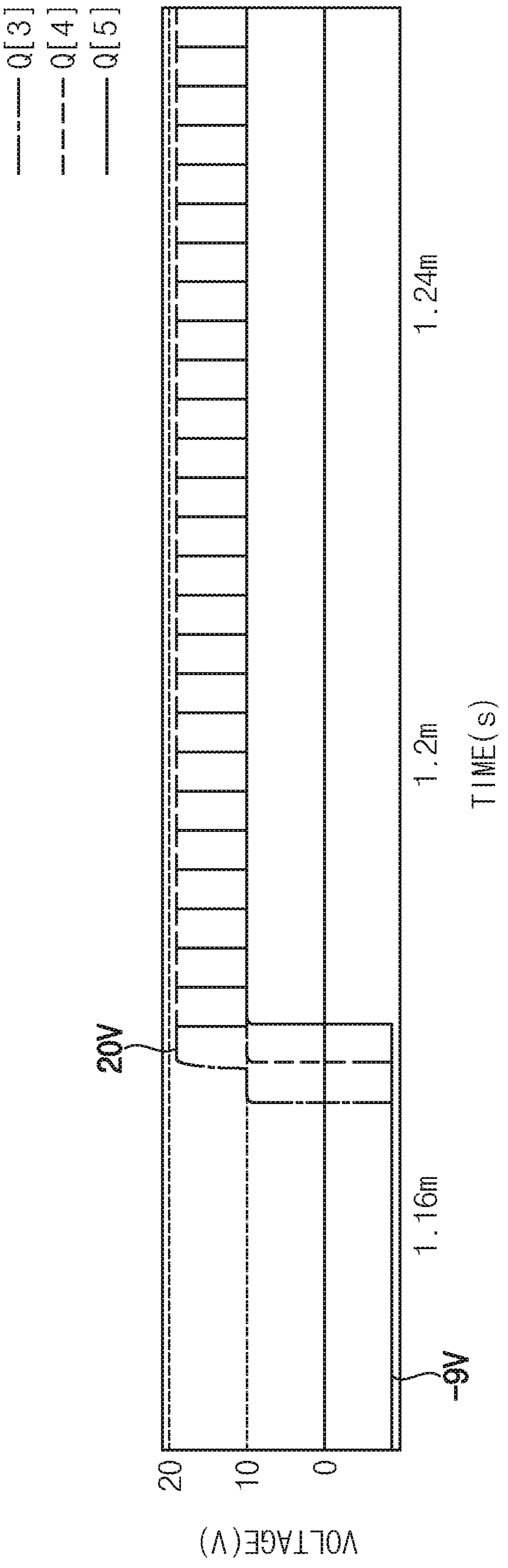
FIG. 17 is a schematic graph illustrating an example of the Q[n] node voltage in case that the emission driving circuit of FIG. 2 includes transistors driven in an enhancement mode.

FIG. 17 is a schematic graph illustrating an example of the Q[n] node voltage in case that the emission driving circuit of FIG. 2 includes transistors driven in an enhancement mode.

A threshold voltage of each of transistors driven in the enhancement mode may be, for example, approximately 4 V.

One example of a third pull-up control node voltage Q[3], a fourth pull-up control node voltage Q[4], and a fifth pull-up control node voltage Q[5] of the emission driving circuit is shown. It may be found in the pull-up control node Q that approximately 20 V is normally exhibited as an example of the bootstrapped voltage (VGH+ΔV), and approximately −9 V is normally output as an example of the second low voltage VGL2.

Figure 18:
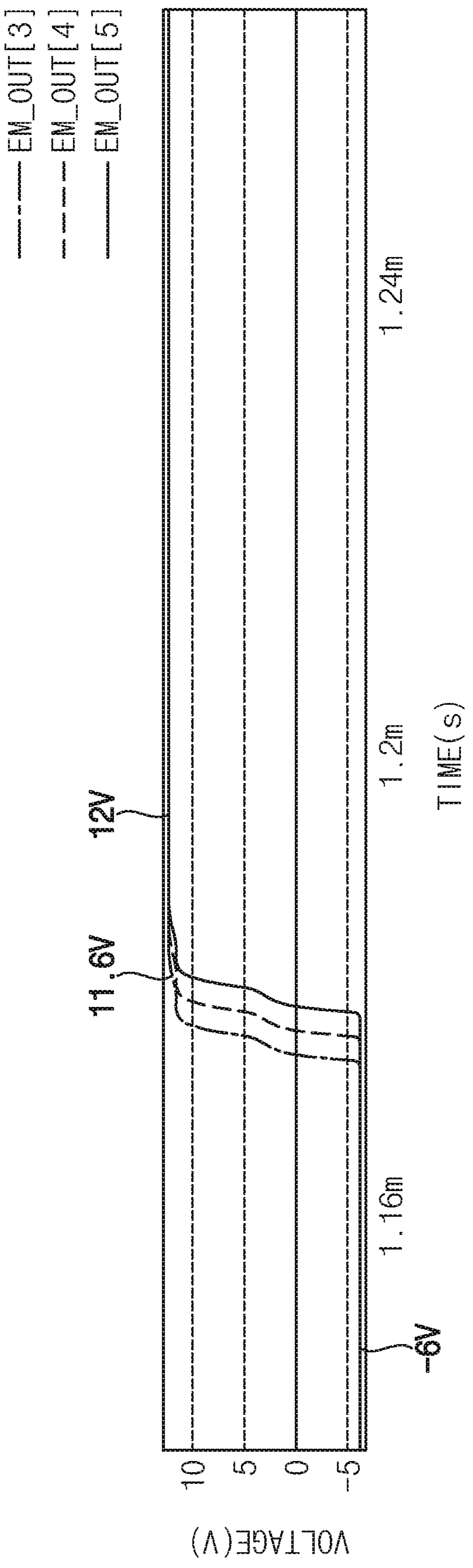
FIG. 18 is a schematic graph illustrating an example of the emission signal in case that the emission driving circuit of FIG. 2 includes the transistors driven in the enhancement mode.

FIG. 18 is a schematic graph illustrating an example of the emission signal in case that the emission driving circuit of FIG. 2 includes the transistors driven in the enhancement mode.

It may be found that a third emission signal EM_OUT[3], a fourth emission signal EM_OUT[4], and a fifth emission signal EM_OUT[5] of the emission driving circuit are normally output as the off-on voltage of the high voltage VGH at the first low voltage VGL1. For example, according to the graph, the first low voltage VGL1 may be approximately −6 V, and the high voltage VGH may be approximately 12 V.

Figure 19:
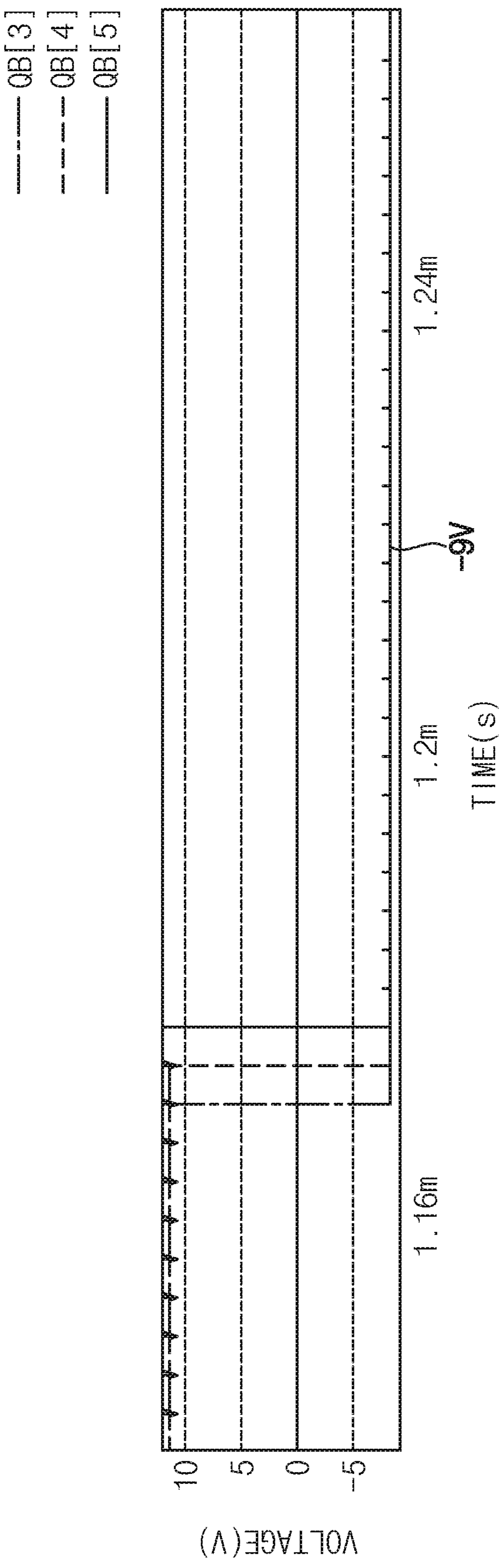
FIG. 19 is a schematic graph illustrating an example of the QB[n] node voltage in case that the emission driving circuit of FIG. 2 includes the transistors driven in the enhancement mode.

FIG. 19 is a schematic graph illustrating an example of the QB[n] node voltage in case that the emission driving circuit of FIG. 2 includes the transistors driven in the enhancement mode.

One example of a third pull-down control node voltage QB[3], a fourth pull-down control node voltage QB[4], and a fifth pull-down control node voltage QB[5] of the emission driving circuit is shown. It may be found in the pull-down control node QB that approximately −9 V is normally output as an example of the second low voltage VGL2.

Figure 20:
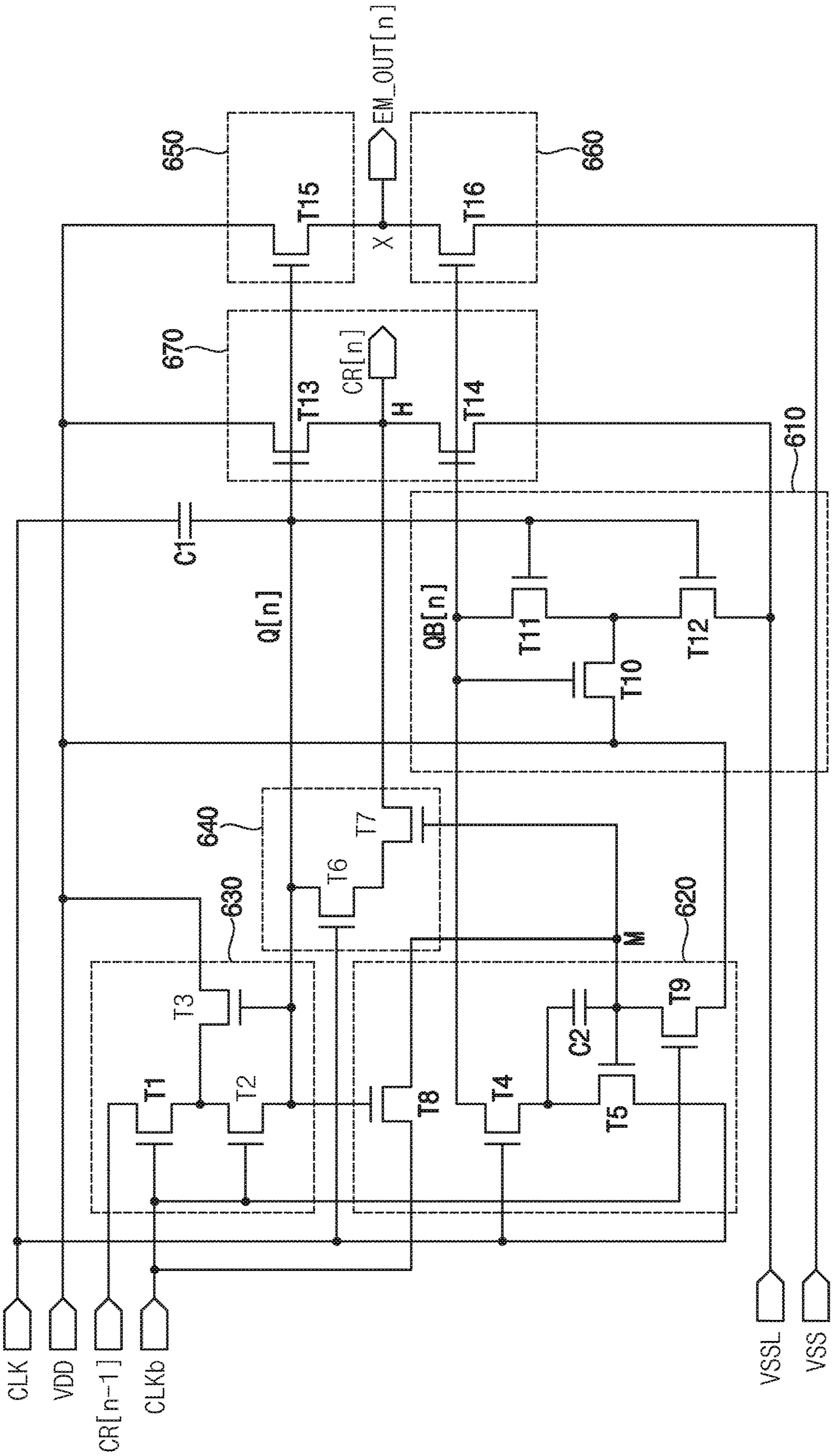
FIG. 20 is a schematic diagram of an equivalent circuit illustrating an emission driving circuit of an emission driver of a display apparatus according to an embodiment of the disclosure.

FIG. 20 is a schematic diagram of an equivalent circuit illustrating an emission driving circuit of an emission driver 600 of a display apparatus according to an embodiment of the disclosure.

An emission driver 600 and a display apparatus according to this embodiment may be distinguishable from the emission driver 600 and the display apparatus of FIG. 2, respectively, at least in that the third clock signal CLKL and the fourth clock signal CLKLb are not applied to the emission driving circuit. The same reference numerals will be used to refer to the same and any repetitive explanation concerning the above elements will be omitted.

Referring to FIG. 20, for example, the first clock signal CLK may be applied to the control electrode of the fourth transistor T4, the control electrode of the sixth transistor T6, and the first electrode of the first capacitor C1, and the second clock signal CLKb may be applied to the control electrode of the first transistor T1, the control electrode of the second transistor T2, the second electrode of the fifth transistor T5, the first electrode of the eighth transistor T8, and the control electrode of the ninth transistor T9.

Figure 21:
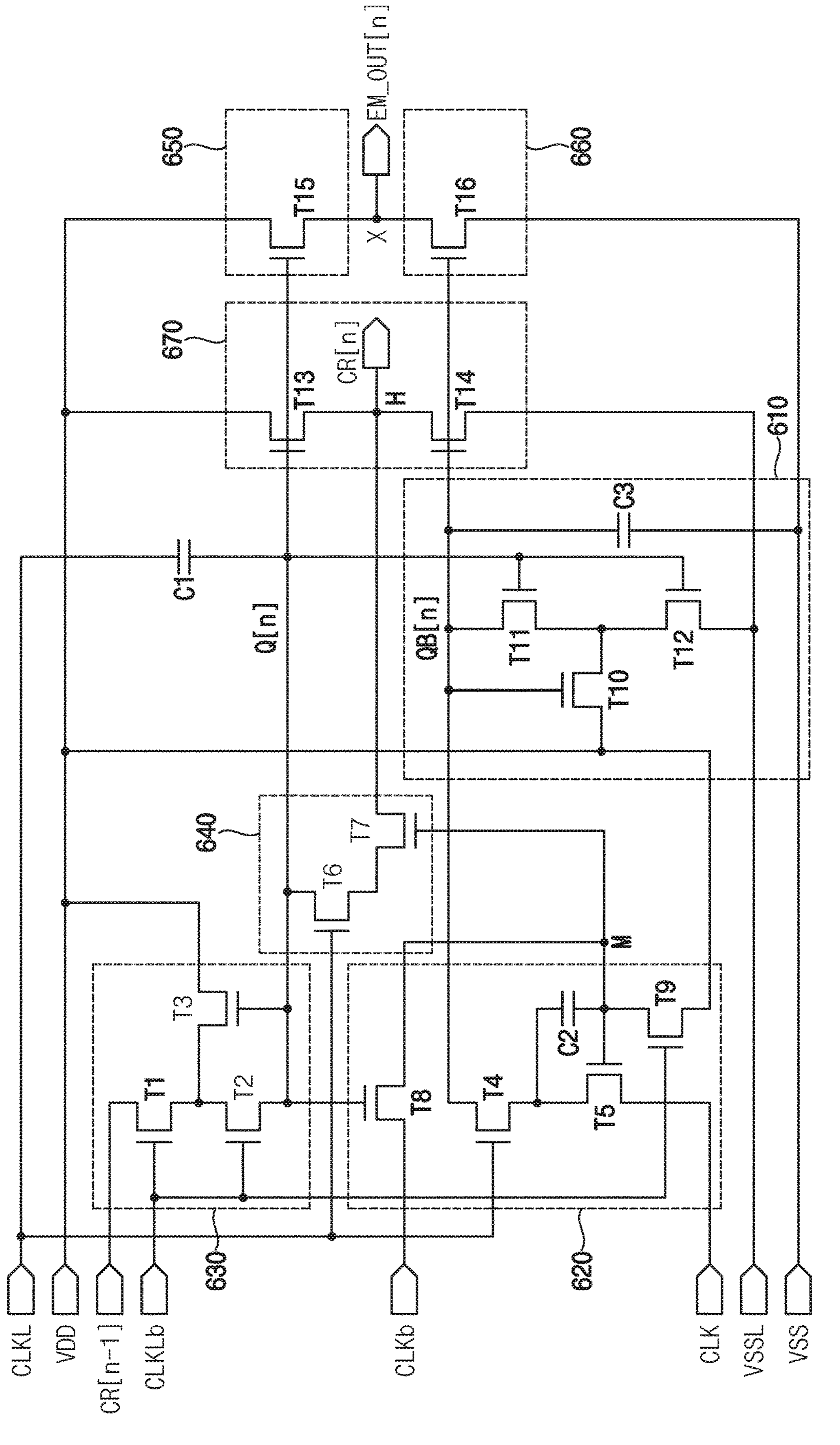
FIG. 21 is a schematic diagram of an equivalent circuit illustrating an emission driving circuit of an emission driver of a display apparatus according to an embodiment of the disclosure.

FIG. 21 is a schematic diagram of an equivalent circuit illustrating an emission driving circuit of an emission driver 600 of a display apparatus according to an embodiment of the disclosure.

An emission driver 600 and a display apparatus according to this embodiment may be distinguishable from the emission driver 600 and the display apparatus of FIG. 2, respectively, at least in that the emission driving circuit further includes a third capacitor C3. The same reference numerals will be used to refer to the same and any repetitive explanation concerning the above elements will be omitted.

Referring to FIG. 21, for example, the first pull-down control circuit 610 may include an eleventh transistor T11 and a twelfth transistor T12, which are connected in series. For example, the first pull-down control circuit 610 may further include a tenth transistor T10 connected to a node between the eleventh transistor T11 and the twelfth transistor T12.

According to the embodiment, the first pull-down control circuit 610 may further include the third capacitor C3. The third capacitor C3 may include a first electrode connected to the pull-down control node QB, and a second electrode to which the second power voltage VSS is applied.

The third capacitor C3 may stabilize the carry signal CR[n] and the emission signal EM_OUT[n], so that reliability of the circuit may be enhanced.

Figure 22:
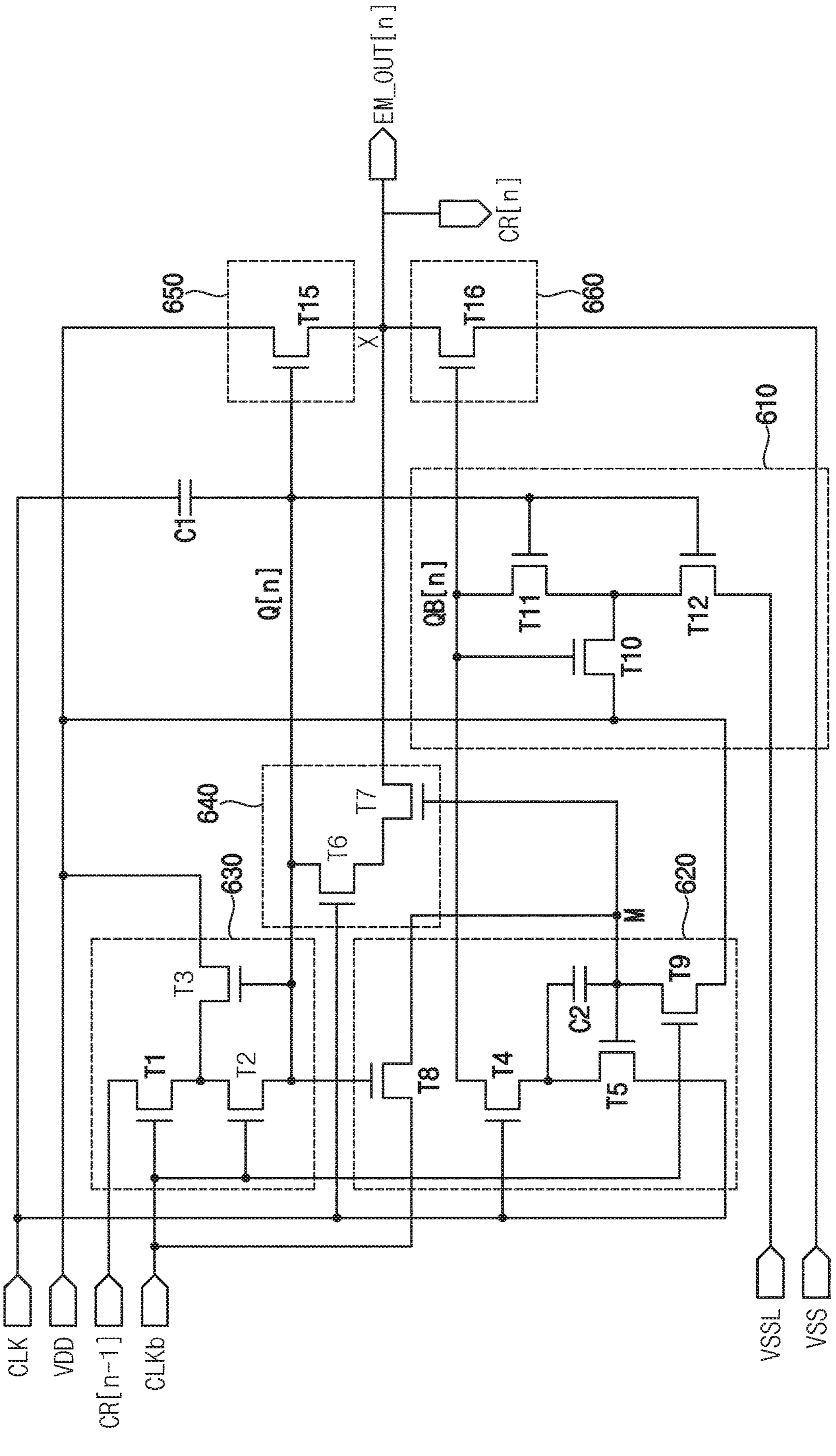
FIG. 22 is a schematic diagram of an equivalent circuit illustrating an emission driving circuit of an emission driver of a display apparatus according to an embodiment of the disclosure.

FIG. 22 is a schematic diagram of an equivalent circuit illustrating an emission driving circuit of an emission driver 600 of a display apparatus according to an embodiment of the disclosure.

An emission driver and a display apparatus according to this embodiment may be distinguishable from the emission driver 600 and the display apparatus of FIG. 2, respectively, at least in that the emission driving circuit does not include the carry output circuit 670, and the third clock signal CLKL and the fourth clock signal CLKLb are not applied to the emission driving circuit. The same reference numerals will be used to refer to the same and any repetitive explanation concerning the above elements will be omitted.

Referring to FIG. 22, for example, the carry signal CR[n] and the emission signal EM_OUT[n] may output a voltage of an X node. The seventh transistor T7 may include a control electrode connected to the M node, the first electrode connected to the second electrode of the sixth transistor T6, and a second electrode connected to an X node.

Figure 23:
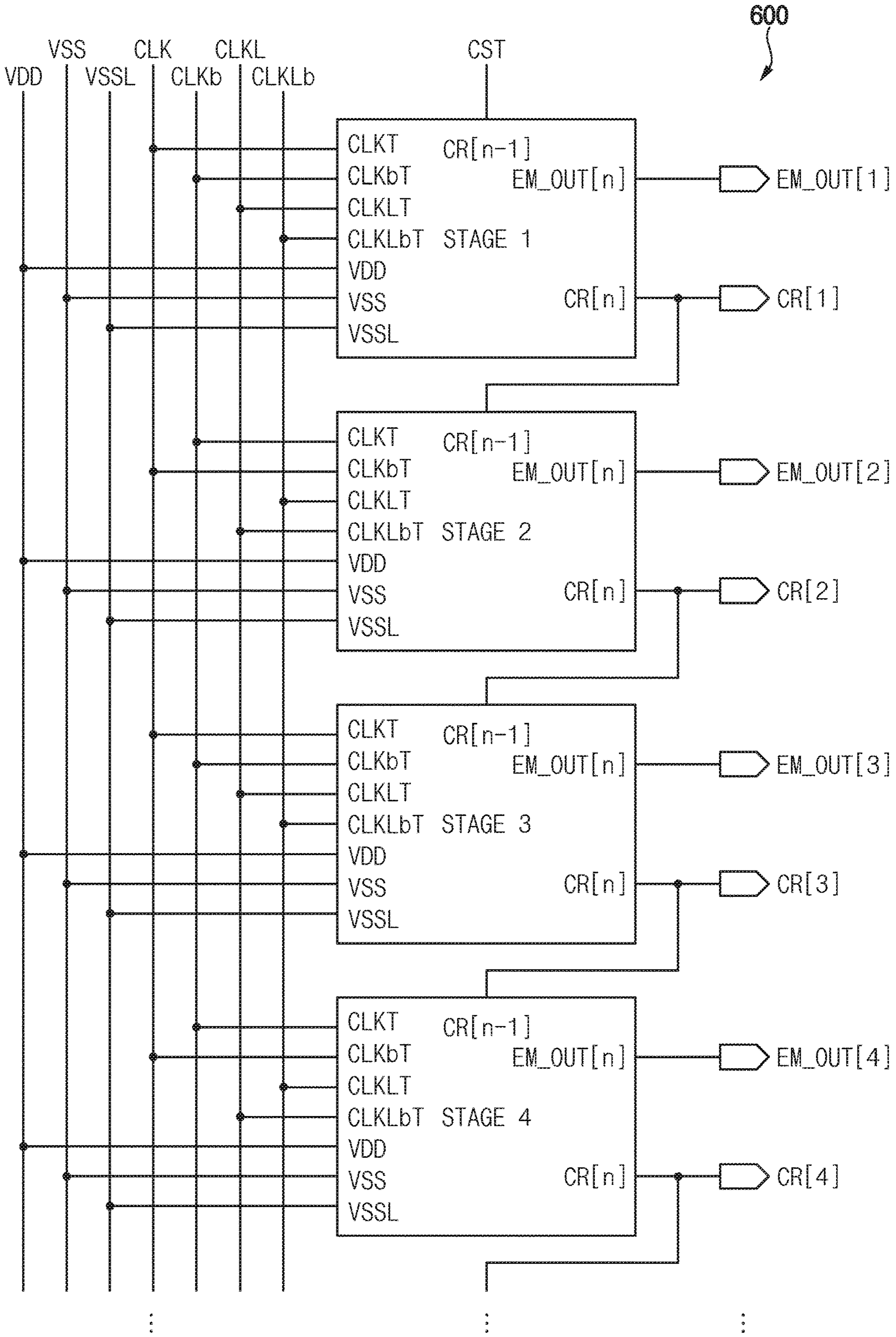
FIG. 23 is a schematic block diagram illustrating an emission driving circuit of a display apparatus according to embodiments of the disclosure.

FIG. 23 is a schematic block diagram illustrating an emission driving circuit according to embodiments of the disclosure.

As shown in FIG. 23, the emission driver 600 may include stages STAGE 1, STAGE 2, STAGE 3, STAGE 4, . . . configured to receive the start signal CST, the first clock signal CLK, the second clock signal CLKb, the third clock signal CLKL, and the fourth clock signal CLKLb, and sequentially output emission signals EM_OUT[1], EM_OUT[2], EM_OUT[3], EM_OUT[4], . . . to pixels row by row.

The first clock signal CLK, the second clock signal CLKb, the third clock signal CLKL, and the fourth clock signal CLKLb may be applied to a first clock terminal CLKT, a second clock terminal CLKbT, a third clock terminal CLKLT, and a fourth clock terminal CLKLbT of a first stage STAGE 1, respectively. The first clock signal CLK, the second clock signal CLKb, the third clock signal CLKL, and the fourth clock signal CLKLb may be applied to a second clock terminal CLKbT, a first clock terminal CLKT, a fourth clock terminal CLKLbT, and a third clock terminal CLKLT of a second stage STAGE 2, respectively. Similarly, the first clock signal CLK, the second clock signal CLKb, the third clock signal CLKL, and the fourth clock signal CLKLb may be applied to a first clock terminal CLKT, a second clock terminal CLKbT, a third clock terminal CLKLT, and a fourth clock terminal CLKLbT of a third stage STAGE 3, respectively. The first clock signal CLK, the second clock signal CLKb, the third clock signal CLKL, and the fourth clock signal CLKLb may be applied to a second clock terminal CLKbT, a first clock terminal CLKT, a fourth clock terminal CLKLbT, and a third clock terminal CLKLT of a fourth stage STAGE 4, respectively.

Figure 24:
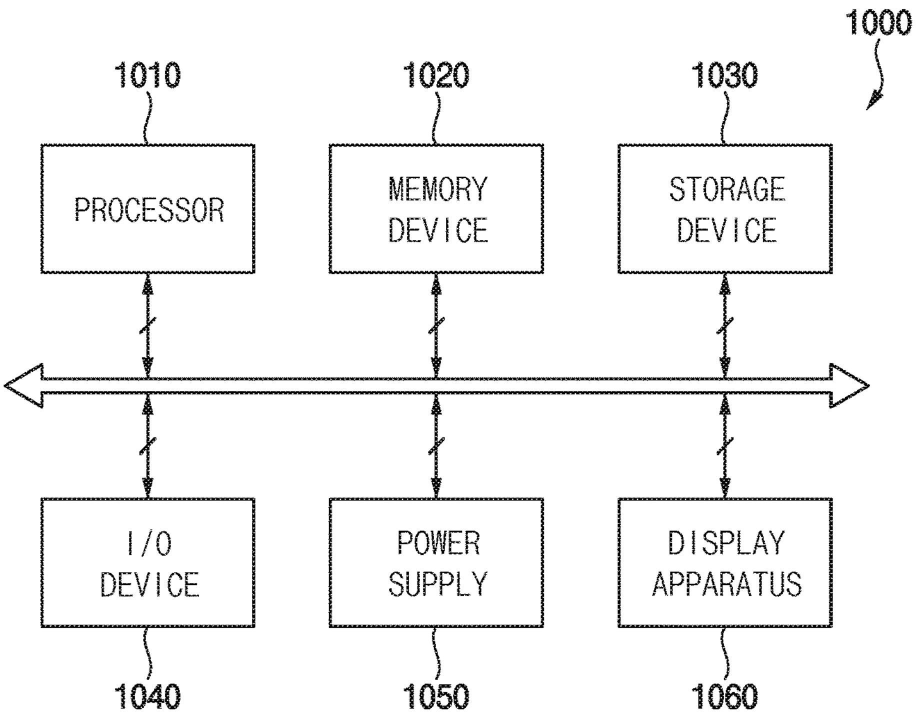
FIG. 24 is a schematic block diagram illustrating an electronic device according to an embodiment of the disclosure.
Figure 25:
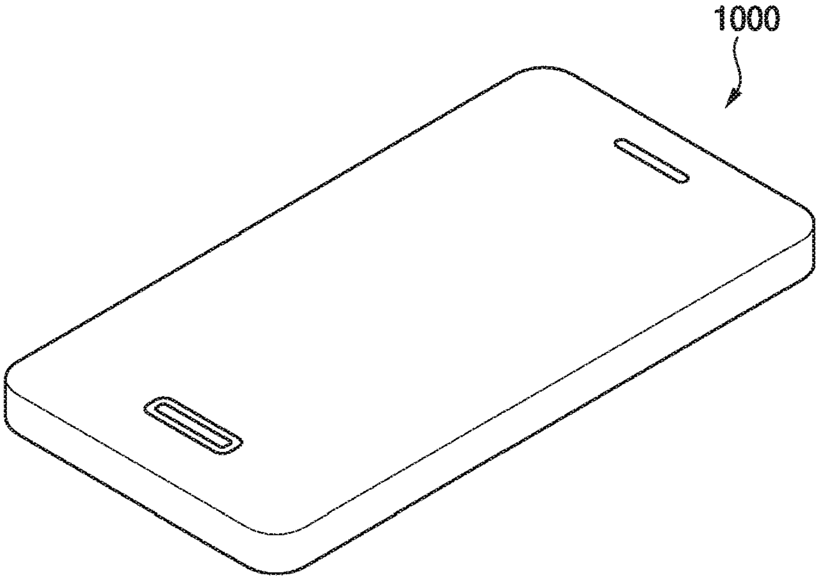
FIG. 25 is a schematic view illustrating an example in which the electronic device of FIG. 24 is implemented as a smart phone.

FIG. 24 is a schematic block diagram illustrating an electronic device according to an embodiment of the disclosure. FIG. 25 is a schematic view illustrating an example in which the electronic device of FIG. 24 is implemented as a smart phone.

Referring to FIGS. 24 and 25, the electronic apparatus 1000 may include a processor 1010, a memory device 1020, a storage device 1030, an input/output (I/O) device 1040, a power supply 1050, and/or a display apparatus 1060. Here, the display apparatus 1060 may be the display apparatus of FIG. 1. The electronic apparatus 1000 may further include ports for communicating with a video card, a sound card, a memory card, a universal serial bus (USB) device, other electronic apparatuses, etc.

According to an embodiment, as shown in FIG. 25, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, or the like.

The processor 1010 may perform various computing functions or various tasks. The processor 1010 may be a micro-processor, a central processing unit (CPU), an application processor (AP), and the like. The processor 1010 may be at least one processor, with some of the at least one processor, separately or in combination, being configured to perform one or more operations. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include, e.g., a solid state drive (SSD) device, a hard disk drive (HDD) device, a CD-ROM device, or the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to the embodiments of the emission driving circuit and the display apparatus, damage caused by deterioration of transistors may be prevented, and a leakage current may be reduced so that the reliability of the emission driving circuit may be enhanced.

The degree of the shift of the threshold voltage of the switching element in the inverting circuit may be reduced so that the lifetime of the circuit may be increased.

The foregoing is illustrative of the disclosure and is not to be construed as limiting thereof. Although a few embodiments of the disclosure have been described, those skilled in the art will readily appreciate that many modifications are possible in the embodiments without materially departing from the novel teachings and advantages of the disclosure. Accordingly, all such modifications are intended to be included within the scope of the disclosure as defined in the claims. In the claims, means-plus-function clauses are intended to cover the structures described herein as performing the recited function and not only structural equivalents but also equivalent structures. Therefore, it is to be understood that the foregoing is illustrative of the disclosure and is not to be construed as limited to the specific embodiments disclosed, and that modifications to the disclosed embodiments, as well as other embodiments, are intended to be included within the scope of the appended claims. The claimed invention is defined by the following claims, with equivalents of the claims to be included therein.

What is claimed is:

1. An emission driving circuit comprising:
- a pull-up circuit configured to output a first power voltage as an emission signal in response to a voltage of a pull-up control node;
- a first pull-down control circuit configured to control a voltage of a pull-down control node in response to the voltage of the pull-up control node; and
- a pull-down circuit configured to output a second power voltage as the emission signal in response to the voltage of the pull-down control node,
- wherein the first pull-down control circuit comprises a first transistor and a second transistor which are electrically connected in series.

2. The emission driving circuit of claim 1, wherein the first transistor includes:
- a control electrode electrically connected to the pull-up control node;
- a first electrode electrically connected to the pull-down control node; and
- a second electrode electrically connected to a first electrode of the second transistor.

3. The emission driving circuit of claim 2, wherein the second transistor includes:
- a control electrode electrically connected to the pull-up control node;
- the first electrode electrically connected to the second electrode of the first transistor; and
- a second electrode that receives a third power voltage.

4. The emission driving circuit of claim 1, wherein the first pull-down control circuit further comprises a third transistor including a first electrode electrically connected to a node between the first transistor and the second transistor.

5. The emission driving circuit of claim 4, wherein the third transistor further includes:
- a control electrode electrically connected to the pull-down control node; and
- a second electrode that receives the first power voltage.

6. The emission driving circuit of claim 4, wherein
- the first pull-down control circuit further comprises a third capacitor, and
- wherein the third capacitor includes:
  - a first electrode electrically connected to the pull-down control node; and
  - a second electrode that receives the second power voltage.

7. The emission driving circuit of claim 1, further comprising:
- a first pull-up control circuit configured to control the voltage of the pull-up control node in response to a previous carry signal which is one of carry signals of previous stages, wherein
- the first pull-up control circuit comprises a fourth transistor and a fifth transistor which are electrically connected in series, and
- the first pull-up control circuit further comprises a sixth transistor including a first electrode electrically connected to a node between the fourth transistor and the fifth transistor.

8. The emission driving circuit of claim 7, wherein
- the fourth transistor includes:
  - a control electrode that receives a second clock signal;
  - a first electrode that receives the previous carry signal; and
  - a second electrode electrically connected to a first electrode of the fifth transistor,
- the fifth transistor includes:
  - a control electrode that receives the second clock signal;
  - the first electrode electrically connected to the second electrode of the fourth transistor; and
  - a second electrode electrically connected to the pull-up control node, and
- the sixth transistor further includes:
  - a control electrode electrically connected to the pull-up control node; and
  - a second electrode that receives the first power voltage.

9. The emission driving circuit of claim 1, further comprising:
- a first capacitor including a first electrode that receives a first clock signal; and
- a second electrode electrically connected to the pull-up control node.

10. The emission driving circuit of claim 1, further comprising:
- a carry output circuit configured to output a carry signal in response to the voltages of the pull-up control node and the voltages of the pull-down control node.

11. The emission driving circuit of claim 10, wherein
- the carry output circuit comprises a seventh transistor,
- a second electrode of the second transistor is electrically connected to a second electrode of the seventh transistor, and
- a third power voltage is applied to the second electrode of the second transistor and the second electrode of the seventh transistor.

12. The emission driving circuit of claim 1, further comprising:
- a second pull-down control circuit configured to control the voltage of the pull-down control node, wherein
- the second pull-down control circuit comprises an eighth transistor and a ninth transistor which are electrically connected in series, and the second pull-down control circuit further comprises a second capacitor including a first electrode electrically connected to a node between the eighth transistor and the ninth transistor.

13. The emission driving circuit of claim 12, wherein the eighth transistor includes:

a control electrode that receives a first clock signal;

a first electrode electrically connected to the pull-down control node; and a second electrode electrically connected to a first electrode of the ninth transistor, the ninth transistor includes:

a control electrode electrically connected to an M node;

the first electrode electrically connected to the second electrode of the eighth transistor; and a second electrode that receives the first clock signal, and the second capacitor further includes a second electrode electrically connected to the M node.

14. The emission driving circuit of claim 12, further comprising:

a second pull-up control circuit configured to control the voltage of the pull-up control node, wherein the second pull-up control circuit comprises a tenth transistor and an eleventh transistor which are electrically connected in series.

15. The emission driving circuit of claim 14, wherein the tenth transistor includes:

a control electrode that receives a first clock signal;

a first electrode electrically connected to the pull-up control node; and a second electrode electrically connected to a first electrode of the eleventh transistor, and the eleventh transistor includes:

a control electrode electrically connected to an M node;

the first electrode electrically connected to the second electrode of the tenth transistor; and a second electrode electrically connected to an X node.

16. The emission driving circuit of claim 1, further comprising:

a first clock signal output terminal that outputs a first clock signal;

a second clock signal output terminal that outputs a second clock signal;

a third clock signal output terminal that outputs a third clock signal; and a fourth clock signal output terminal that outputs a fourth clock signal, wherein a low-level voltage of each of the third clock signal and the fourth clock signal is lower than a low-level voltage of each of the first clock signal and the second clock signal.

17. The emission driving circuit of claim 16, further comprising:

a first pull-up control circuit configured to control the voltage of the pull-up control node in response to a previous carry signal which is one of carry signals of previous stages;

a second pull-down control circuit configured to control the voltage of the pull-down control node;

a second pull-up control circuit configured to control the voltage of the pull-up control node; and a first capacitor electrically connected to the pull-up control node, wherein the first pull-up control circuit comprises a fourth transistor and a fifth transistor which are electrically connected in series, the second pull-down control circuit comprises an eighth transistor and a ninth transistor which are electrically connected in series, and a twelfth transistor, the second pull-up control circuit comprises a tenth transistor and an eleventh transistor which are electrically connected in series, the third clock signal is applied to a control electrode of the eighth transistor, a control electrode of the tenth transistor, and a first electrode of the first capacitor, and the fourth clock signal is applied to a control electrode of the fourth transistor, a control electrode of the fifth transistor, and a control electrode of the twelfth transistor.

18. An emission driving circuit including stages, wherein at least one of the stages comprises:

a first transistor including a control electrode that receives a fourth clock signal, a first electrode that receives a previous carry signal which is one of carry signals of previous stages, and a second electrode electrically connected to a first electrode of a second transistor;

the second transistor including a control electrode that receives the fourth clock signal, the first electrode electrically connected to the second electrode of the first transistor, and a second electrode electrically connected to a pull-up control node;

a third transistor including a control electrode electrically connected to the pull-up control node, a first electrode electrically connected to the second electrode of the first transistor, and a second electrode that receives a first power voltage;

a fourth transistor including a control electrode that receives a third clock signal, a first electrode electrically connected to a pull-down control node, and a second electrode electrically connected to a first electrode of a fifth transistor;

the fifth transistor including a control electrode electrically connected to an M node, the first electrode electrically connected to the second electrode of the fourth transistor, and a second electrode that receives a first clock signal;

a sixth transistor including a control electrode that receives the third clock signal, a first electrode electrically connected to the pull-up control node, and a second electrode electrically connected to a first electrode of the seventh transistor;

the seventh transistor including a control electrode electrically connected to the M node, the first electrode electrically connected to the second electrode of the sixth transistor, and a second electrode electrically connected to an H node;

an eighth transistor including a control electrode electrically connected to the pull-up control node, a first electrode that receives a second clock signal, and a second electrode electrically connected to the M node;

a ninth transistor including a control electrode that receives the fourth clock signal is applied, a first electrode electrically connected to the M node, and a second electrode that receives the first power voltage;

a tenth transistor including a control electrode electrically connected to the pull-down control node, a first electrode that receives the first power voltage, and a second electrode electrically connected to a first electrode of a twelfth transistor;

an eleventh transistor including a control electrode electrically connected to the pull-up control node, a first electrode electrically connected to the pull-down control node, and a second electrode electrically connected to the first electrode of the twelfth transistor;

the twelfth transistor including a control electrode electrically connected to the pull-up control node, the first electrode electrically connected to the second electrode of the eleventh transistor, and a second electrode that receives a third power voltage;

a thirteenth transistor including a control electrode electrically connected to the pull-up control node, a first electrode that receives the first power voltage, and a second electrode electrically connected to the H node;

a fourteenth transistor including a control electrode electrically connected to the pull-down control node, a first electrode electrically connected to the H node, and a second electrode that receives the third power voltage;

a fifteenth transistor including a control electrode electrically connected to the pull-up control node, a first electrode that receives the first power voltage, and a second electrode electrically connected to an X node;

a sixteenth transistor including a control electrode electrically connected to the pull-down control node, a first electrode electrically connected to the X node, and a second electrode that receives a second power voltage;

a first capacitor including a first electrode that receives the third clock signal, and a second electrode electrically connected to the pull-up control node; and a second capacitor including a first electrode electrically connected to the M node, and a second electrode electrically connected to the first electrode of the fifth transistor.

19. A display apparatus comprising:

a display panel; and an emission driver configured to output an emission signal to the display panel, wherein the emission driver comprises:

a pull-up circuit configured to output a first power voltage as the emission signal in response to a voltage of a pull-up control node;

a first pull-down control circuit configured to control a voltage of a pull-down control node in response to the voltage of the pull-up control node; and a pull-down circuit configured to output a second power voltage as the emission signal in response to the voltage of the pull-down control node, and the first pull-down control circuit comprises a first transistor and a second transistor which are electrically connected in series.

20. The display apparatus of claim 19, wherein the emission driver further comprises a third transistor including a first electrode electrically connected to a node between the first transistor and the second transistor.

* * * * *